United States Patent
Kawaguchi et al.

(10) Patent No.: US 7,170,925 B2
(45) Date of Patent: Jan. 30, 2007

(54) CDMA RECEIVER

(75) Inventors: Noriyuki Kawaguchi, Sapporo (JP); Satoshi Nakamura, Kawasaki (JP); Kensuke Sawada, Kawasaki (JP); Dai Kimura, Kawasaki (JP); Tokuro Kubo, Kawasaki (JP); Morihiko Minowa, Kawasaki (JP)

(73) Assignee: Fujitsu Limited, Kawsaki (JP)

( * ) Notice: Subject to any disclaimer, the term of this patent is extended or adjusted under 35 U.S.C. 154(b) by 0 days.

(21) Appl. No.: 10/074,939

(22) Filed: Feb. 13, 2002

(65) Prior Publication Data

US 2002/0110109 A1 Aug. 15, 2002

Related U.S. Application Data

(63) Continuation of application No. PCT/JP99/04990, filed on Sep. 14, 1999.

(51) Int. Cl.
*H04B 1/707* (2006.01)

(52) U.S. Cl. .................................................... 375/148
(58) Field of Classification Search ............... 375/347, 375/349, 350, 144, 148
See application file for complete search history.

(56) References Cited

U.S. PATENT DOCUMENTS

| | | | | |
|---|---|---|---|---|
| 5,444,721 A | * | 8/1995 | Okanoue et al. | ............ 714/794 |
| 5,701,333 A | * | 12/1997 | Okanoue et al. | ............ 375/347 |
| 5,812,593 A | | 9/1998 | Kaku | |
| 5,881,057 A | | 3/1999 | Komatsu | |
| 6,021,125 A | * | 2/2000 | Sakoda et al. | ............... 370/345 |
| 6,192,066 B1 | | 2/2001 | Asanuma | |
| 6,229,798 B1 | | 5/2001 | Naruse | |
| 6,389,060 B1 | | 5/2002 | Naruse | |

FOREIGN PATENT DOCUMENTS

| | | |
|---|---|---|
| JP | 7-231278 | 8/1995 |
| JP | 8-335899 | 12/1996 |
| JP | 09-214410 | 8/1997 |
| JP | 10-022885 | 1/1998 |
| JP | 10-190525 | 7/1998 |
| JP | 10-190526 | 7/1998 |
| JP | 11-008606 | 1/1999 |
| JP | 11-46158 | 2/1999 |
| JP | 11-055166 | 2/1999 |
| JP | 11-068647 | 3/1999 |
| JP | 11-068700 | 3/1999 |

OTHER PUBLICATIONS

Notification of Reasons for Refusal dated Oct. 18, 2005 with translation.

* cited by examiner

*Primary Examiner*—Stephen Chin
*Assistant Examiner*—Kevin Kim
(74) *Attorney, Agent, or Firm*—Katten Muchin Rosenman LLP

(57) ABSTRACT

In a CDMA receiver for applying despread processing to direct wave or delayed waves that arrive via each path of multiple paths, applying synchronous detection processing to the despread signals obtained, combining the detection signals of respective paths and discriminating the received data on the basis of the combined signal, (1) a weighting unit provided for every path measures power of delayed received waves that arrive via its own path and, if the reception power is less than a set level (breakpoint level), subjects an output signal to weighting conforming to the reception power; (2) a RAKE combiner combines signals output from the weighting units of the respective paths; and (3) a data discrimination unit discriminates receive data based upon the output signal of the combiner.

16 Claims, 28 Drawing Sheets

FIG. 11

(ex)
WHEN $It=0.0271$, $Qt=0.0156$, $M=2$, $m=4$ HOLD $(At, Bt) = 32 \cdot (0.0271, 0.0156)$
$= (0.866, 0.5)$ $C = 32 \rightarrow 2^5$ (L=5)

N=1 BECAUSE m=4, L=5 AT N=L-m

N=1 > 0

$(At', Bt') = (0.01355, 0.0078)$

FIG. 33
PRIOR ART
(a)
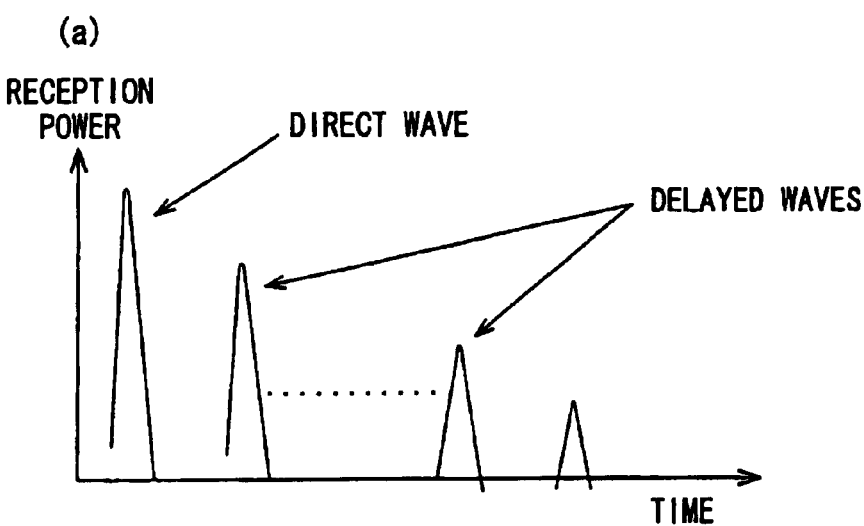
(b)
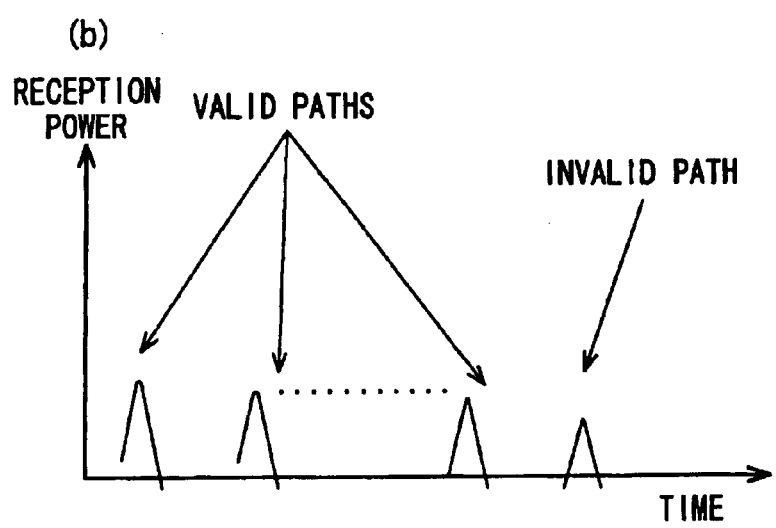

CDMA RECEIVER

This application is a continuation of international application No. PCT/JP99/04990, filed Sep. 14, 1999.

BACKGROUND OF THE INVENTION

This invention relates to a CDMA receiver and, more particularly, to a CDMA receiver for applying despread processing to direct waves or delayed waves that arrive via each path of multiple paths, applying synchronous detection processing to the despread signals obtained, combining the detection signals of respective paths and discriminating the received data on the basis of the combined signal.

DS-CDMA (Direct Sequence Code Division Multiple Access) communication is the focus of attention as a promising candidate for next-generation wireless access because this scheme makes possible high-speed data communication for voice, facsimile, electronic mail, still images and moving images. Such a DS-CDMA communication scheme achieves spectrum spreading by directly multiplying a signal (transmit information), which is to undergo spectrum spreading, by a signal (a spreading code) having a band much broader than that of the first-mentioned signal.

In mobile communication, maximum frequency is decided by the velocity of the mobile station and the frequency of the carrier waves, random changes in amplitude and phase occur and so does fading. As a consequence, it is very difficult to achieve stable reception at maximum frequency in comparison with stationary radio communication. The above-mentioned spread-spectrum communication scheme is effective as means for mitigating such deterioration caused by the influence of frequency-selective fading. The reason for this is that since a narrow-band signal is spread over a high-frequency band and then transmitted. This means that even if a decline in reception field strength occurs in a certain specific frequency region, information from elsewhere in the band can be reconstructed with little error.

Further, with mobile communication, delayed waves from distant high-rise buildings or mountains give rise to a multipath fading environment if fading similar to that mentioned above is produced by the receiver surroundings. In the case of direct sequence (DS), the delayed waves constitute interference with respect to the spreading code and invite a decline in reception characteristics. RAKE reception is known as one method in which such delayed waves are used positively in improvement of characteristics. RAKE reception involves subjecting each delayed wave that arrives via each path of multipath to despread processing using a code identical with the spreading code, subjecting the obtained despread signals to delay processing conforming to the path to thereby make the timings agree, subsequently performing synchronous detection, combining signals, which are obtained by such synchronous detection, upon applying weighting in accordance with the reception level, and discriminating data using the combined signal.

FIG. 28 is a diagram showing the structure of a CDMA receiver. A radio unit 1 converts a high-frequency signal received by an antenna to a baseband signal by applying a frequency conversion (RF→IF conversion). A quadrature detector 2 subjects the baseband signal to quadrature detection and outputs in-phase component (I-phase component) data and quadrature component (Q-component) data. The quadrature detector 2 includes a receive-carrier generator 2a, a phase shifter 2b for shifting the phase of the receive carrier by $\pi/2$, and multipliers 2c, 2d for multiplying the baseband signal by the receive carrier and outputting the I-component signal and the Q-component signal. Low-pass filters (LPF) 3a, 3b limit the bands of these output signals and AD converters 4a, 4b convert the I- and Q-component signals to digital signals and input the digital signals to a searcher 5, with performs a multipath search, and to a RAKE receiver 6. The RAKE receiver 6 has a plurality fingers $6a_1$ to $6a_z$ for executing processing (despreading, delay-time adjustment, synchronous detection, etc) conforming to the respective paths of multipath, a RAKE combiner 6b for weighting the signals, which are output from the fingers, in accordance with the reception level and then combining the signals, and a discrimination unit 6c for discriminating data using the combined signal.

The reception level of the signal component (the desired signal) of the local channel sent from a transmitter varies in dependence upon multipath, as shown in FIG. 29, and arrival time at the receiver differs as well. Further, the signal received at the antenna includes other channel components in addition to the channel that has been assigned to the local receiver. Accordingly, the searcher 5 extracts the desired signal from the antenna receive signal by a matched filter (not shown) using the spreading code of its own channel. That is, when a direct-sequence signal (DS signal) that has been influenced by multipath is input to the search 5, the latter performs an autocorrelation operation using the matched filter and outputs a pulse train having a plurality of peaks. The searcher detects multipath from the pulse train based upon peak signals $MP_1$ to $MP_4$ that are larger than a threshold value, detects delay times $t_1$ to $t_4$ on each of the paths and inputs despreading-start timing data and delay-time adjustment data to the fingers $6a_1$ to $6a_z$ corresponding to the respective paths.

A despreader/delay-time adjusting unit 7 of each of the fingers $6a_1$ to $6a_z$ subjects a delayed wave that arrives via a prescribed path to despread processing using a code identical with the spreading code, performs dump integration, then applies delay processing conforming to the path and inputs the processed signal to a synchronous detector (phase correction unit) 8. The synchronous detector 8 detects a pilot signal contained in the receive signal, finds the phase difference between this pilot signal and an already known pilot signal, and restores the phase of the despread information signal by the amount of the phase difference. The information signal and pilot signal contained in the receive signal both undergo phase rotation owing to transmission. However, if a signal-point position vector $P_{ACT}$ (see FIG. 30) of this pilot signal is known on the receiving side, then the phase-rotation angle $\theta$ of the pilot signal ascribable to transmission will be obtained because the ideal signal-point position vector $P_{IDL}$ is already known. Accordingly, the synchronous detector 8 detects the pilot signal, calculates the phase-rotation angle $\theta$ thereof and subjects each information signal to processing to rotate it by a rotation angle of $-\theta$, thereby restoring the original information signal. As a result, the discrimination unit 6c is capable of performing highly precise demodulation of data.

The signals output from the phase detectors 8 of respective ones of the fingers $61_a$ to $6a_z$ are combined upon being weighted in accordance with the reception level, and the discrimination unit 6c discriminates "1", "0" of the data using the combined signal.

FIG. 31 is a diagram showing another structure of the CDMA receiver, in which components identical with those of the CDMA receiver of FIG. 28 are designated by like reference characters. This structure differs in that (1) a valid-path detector 5a is provided within the searcher to detect whether a path is valid or invalid and input the result of the path valid/invalid detection to the RAKE combiner 6*b*, and (2) only output signals from fingers conforming to the valid paths are weight in accordance with the signal level and combined by the RAKE combiner 6*b*. FIG. 32 is a diagram showing the structure of the valid-path detector. Average power calculation units $5b_1$ to $5b_N$ calculate first to Nth average powers based upon the outputs of matched filters (not shown), and a power comparator 5*c* obtains maximum and minimum average powers Pmax, Pmin, recognizes valid paths that satisfy the following expressions:

$P\max \geq P > (P\max - N)$ $P \geq P\min + M$ and invalid paths that do not satisfy these expressions, and reports these paths to the RAKE combiner 6*b*.

With the RAKE receiver of FIG. 28, all paths are combined as valid paths by the RAKE combiner and data discrimination is performed based upon the combined signal. However, the paths include invalid paths and the invalid paths constitute interference. In other words, in accordance with the RAKE receiver of FIG. 28, even invalid signals are combined, a decline in sensitivity is produced and receiver performance is affected.

On the other hand, with the RAKE receiver of FIG. 31, path validity/invalidity is detected and only valid paths are combined. As a result, sensitivity and performance are improved in comparison with the RAKE receiver of FIG. 28. It should be noted that a base station performs transmission power control in order to render reception power constant (in order to render reception quality at the base station constant). As a result, reception power of direct waves or delayed waves shown in (a) of FIG. 33 declines in accordance with transmission power control, as shown in (b) of FIG. 33, and therefore it becomes difficult to distinguish between valid paths and invalid paths. Further, since all paths are not necessarily valid paths (paths on which gain is obtained), characteristics deteriorate if all of these paths are combined. In other words, with a conventional RAKE receiver, there are instances where invalid paths are regarded as valid paths and combined and instances where valid paths are regarded as invalid paths and are not combined. A problem that results in a decline in sensitivity and performance.

Further, with the conventional RAKE receiver, a problem which arises is the need to provide the highly precise valid-path detector circuit, which relies upon the setting of two-stage threshold values, as mentioned above, in order to detect invalid paths without causing a decline in sensitivity.

Further, in a CDMA receiver, it is necessary to change the valid/invalid-path discrimination processing or parameters depending upon the transmission rate. However, the conventional RAKE receiver does not possess such a function and, hence, cannot cope with transmission rate.

SUMMARY OF THE INVENTION

Accordingly, an object of the present invention is to provide a CDMA receiver in which a decline in sensitivity due to invalid paths can be suppressed and transmission power can be reported.

Another object of the present invention is to provide a CDMA receiver in which, with regard to paths for which the valid/invalid path determination cannot be made, the output of a finger is weighted in accordance with the degree of valid-path likeness, a valid path is rescued and a path that has no valid-path likeness is excluded, whereby sensitivity and receiver performance are improved.

Another object of the present invention is to provide a CDMA receiver for controlling a set level (breakpoint level), which is a criterion of degree of valid-path likeness, in accordance with a change of transmission rate, and weighting a finger output in accordance with the degree of valid-path likeness.

Another object of the present invention is to provide a CDMA receiver that does not require a highly precise valid-path detector circuit.

Another object of the present invention is to provide a CDMA receiver in which sensitivity or receiver performance is improved by varying a set level, which is for discriminating a valid path, based upon a reference SIR or maximum/minimum value of transmission power when the reference SIR of transmission power control is changed in order to make an error rate equal to a set value or when the maximum/minimum value of transmission power is changed.

The present invention relates to a CDMA receiver for applying despread processing to direct wave or delayed waves that arrive via each path of multiple paths, applying synchronous detection processing to the despread signals obtained, combining the detection signals of respective paths and discriminating the received data on the basis of the combined signal. In the CDMA receiver of the present invention, (1) a weighting unit provided for every path is so adapted that if a prescribed signal component (reception power, SIR, etc.) of a direct wave or delayed wave that arrives via an assigned path is below a set level, the weighting unit applies weighting, which conforms to the level of this signal component, to an output signal (cf. the detection signal); (2) a RAKE combiner combines signals output from the weighting units of the respective paths; and (3) a data discrimination unit discriminates receive data based upon the output signal of the combiner. In this case, the weighting is made $M^{-N}$ (where M is an integer equal to or greater than 2), and the smaller the signal level becomes in comparison with a set level, the larger N is made.

Thus, with regard to a path for which the valid/invalid path determination cannot be made, weighting is applied to a finger output in accordance with the degree of valid path likeness, as a result of which valid paths can be rescued. Moreover, by reducing the weighting of paths that have no valid path likeness, invalid paths can be excluded. This makes it possible to improve sensitivity and receiver performance. Further, the lower the transmission rate of a symbol becomes and the greater the spreading gain, the lower the above-mentioned set level (breakpoint level) is made. If this arrangement is adopted, the set level (breakpoint level) serving as the criterion of degree of valid path likeness can be controlled in accordance with a change in transmission rate and weighting that conforms to the degree of valid path likeness can be added onto a finger output. Further, reception power can be calculated in approximate terms by multiplying the combined signal by the reciprocal of maximum weighting among the weightings of respective paths.

Further, when a set level for certifying a valid path is set based upon reception power in a CDMA receiver according to the present invention, a maximum level Pmax or minimum level Pmin of reception power of each path is detected, a value (Pmax−ΔY) obtained by subtracting a set level ΔY from the maximum level Pmax, or a value (Pmin+ΔZ) obtained by adding a set level ΔZ to the minimum level Pmin, is adopted as the above-mentioned set level, a weighting coefficient is decided based upon the difference or ratio between the actual reception level of each path and the set level, and the output signal is weighted. Alternatively, when a set level for certifying a valid path is set based upon a SIR, the SIR of each path is estimated, a weighting coefficient is decided based upon the difference or ratio between the estimated SIR and the set SIR serving as the set level, and the output signal is weighted. In this case, when a reference SIR of transmission power control is updated in such a manner that an error rate becomes the set value, the set SIR also is updated. If this arrangement is adopted, the sensitivity of a RAKE receiver and receiver performance can be improved.

BRIEF DESCRIPTION OF THE DRAWINGS

FIG. 11 is an example of numerical values of various signals up to the decision of a weighted channel estimation signal;

FIG. 33 is a diagram useful in describing a problem encountered in the prior art.

DESCRIPTION OF THE PREFERRED EMBODIMENT (A) CDMA Receiver (a) Overall Structure

Figure 1:
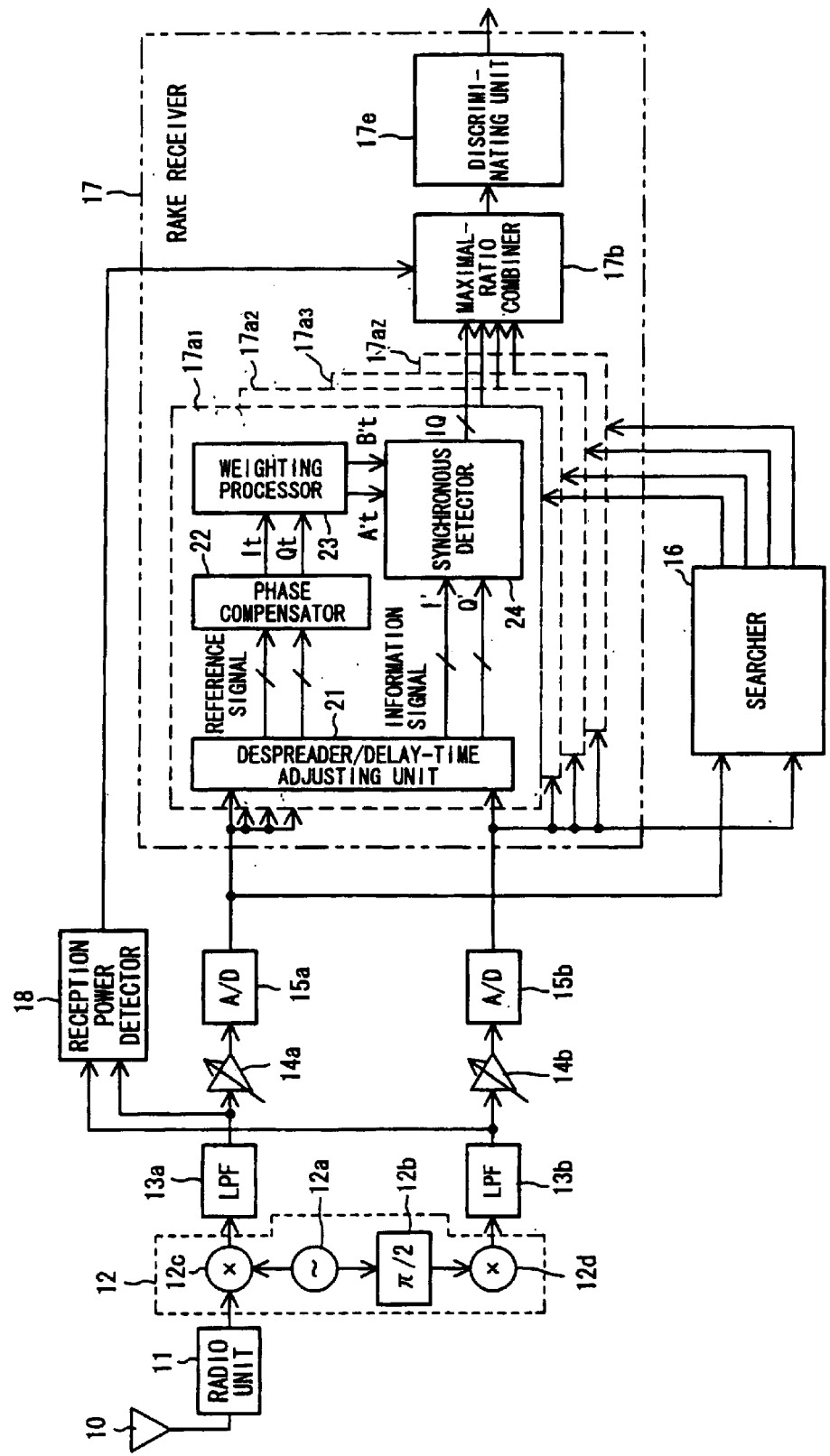
FIG. 1 is diagram showing the structure of a CDMA receiver according to the present invention.

FIG. 1 is a diagram showing the structure of a CDMA receiver according to the prior art. A radio unit 11 converts a high-frequency signal received by an antenna 10 to a baseband signal by applying a frequency conversion (RF→IF conversion). A quadrature detector 12 subjects the baseband signal to quadrature detection and outputs in-phase component (I-component) data and quadrature component (Q-component) data. The quadrature detector 12 includes a receive-carrier generator 12a, a phase shifter 12b for shifting the phase of the receive carrier by $\pi/2$, and multipliers 12c, 12d for multiplying the baseband signal by the receive carrier and outputting the I-component signal and the Q-component signal. Low-pass filters (LPF) 13a, 13b limit the bands of these output signals, AGC circuits 14a, 14b control gain automatically in such a manner that the output level is rendered constant, and AD converters 15a, 15b convert the I- and Q-component signals to digital signals and input the digital signals to a searcher 16 and RAKE receiver 17. A reception power detector 18 measures reception power and inputs the measured power to the RAKE receiver 17.

The RAKE receiver 17 has a plurality fingers $17a_1$ to $17a_z$ for executing processing (despreading, delay-time adjustment, synchronous detection, etc) conforming to the respective paths of multipath, a RAKE combiner 17b for weighting the signals, which are output from the fingers, in accordance with the reception level and then combining (by maximal ratio combining) the signals, and a discrimination unit 17c for discriminating data using the combined signal. Upon receiving input of a direct-sequence signal (DS signal) that has been influenced by the multipath effect, the searcher 16 detects multipath by performing an autocorrelation operation using a matched filter and inputs despreading-start timing data and delay-time adjustment data of each path to the corresponding one of the fingers $17a_1 \sim 17a_z$.

A despreader/delay-time adjusting unit 21 of each of the fingers $17a_1$ to $17a_z$ subjects a direct wave or delayed wave that arrives via a prescribed path to despread processing using a code identical with the spreading code, performs dump integration, then applies delay processing conforming to the path and outputs two types of signals, namely a pilot signal (reference signal) and information signal. A phase compensator 22 averages the voltages of the I- and Q-components of the pilot signal over a prescribed number of slots and outputs channel estimation signals It, Qt. One slot is a basic unit for performing transmission power control and is composed of a plurality of symbols. This is an example in which one frame (10 ms) is equal to 16 slots.

Figure 2:
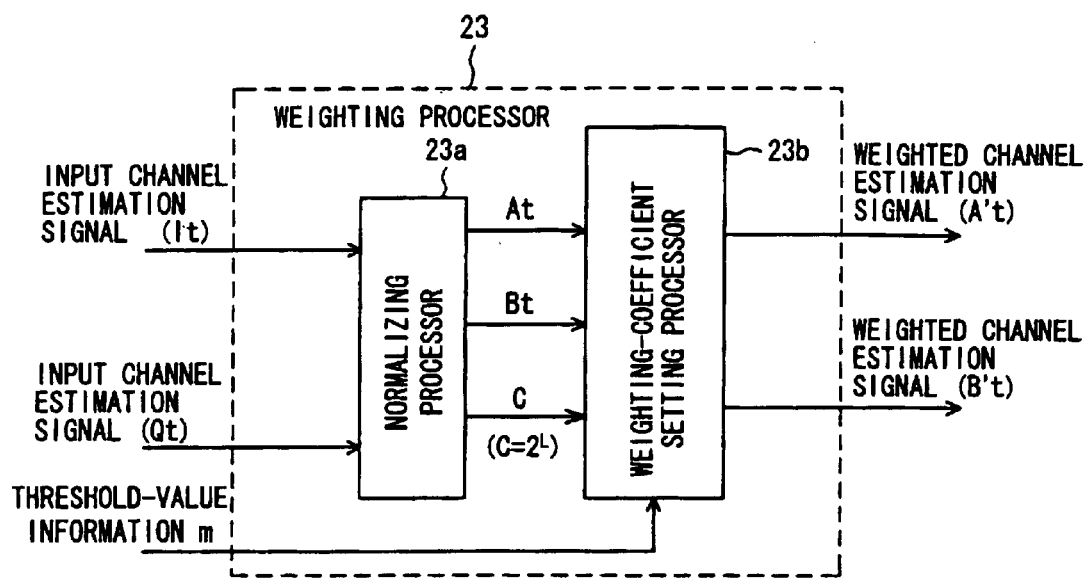
FIG. 2 is a diagram showing the structure of a weighting processor for outputting a weighted channel estimation signal.

A weighting processor 23 subjects the estimation channel signals (It,Qt) at time t to weighting processing and outputs weighted channel estimation signals. FIG. 2 is a diagram useful in describing weighting processing. A normalizing processor 23a applies normalization processing to the channel estimation signals (It,Qt) input thereto. Normalization processing refers to processing through which the channel estimation signals (It,Qt) are made a circle of radius 1. Accordingly, the normalizing processor 23a obtains a multiple C that satisfies the following equation:

$$C \cdot (It^2 + Qt^2)^{1/2} = 1 \quad (1)$$

and obtains normalized channel estimation signals At, Bt ($At^2+Bt^2=1$) in accordance with the following equation:

$$(At, Bt) = C(It, Qt) \quad (2)$$

Here ($It^2+Qt^2$) is the reception power. In other words, the normalizing processor 23a finds the multiple C for which reception power P will become 1, thereby normalizing the channel estimation signals. If reception power P increases, C decreases; if reception power P decreases, then C increases.

A weighting-coefficient setting processor 23b converts the multiple C to a $2^L$ format and executes weighting processing in accordance with the L obtained by the conversion, channel estimation signals (At,Bt) and a separately set threshold value (referred to as a "breakpoint" below). For example, a value referred to as "m" is set in the weighting-coefficient setting processor 23b as the breakpoint in advance. When the channel estimation values (It,Qt) are input to the weighting processor 23 at time t, the normalizing processor 23a obtains (At,Bt) and the multiple C by normalization processing, converts C to the 2L format and inputs the result to the weighting-coefficient setting processor 23b. The latter compares L with the breakpoint m. This comparison processing is implemented by performing the operation N=L−m and then discriminating the sign thereof. If the amplitudes of the channel estimation signals (It,Qt) are large, i.e., if the reception power P is high and $N \leq 0$ ($L \leq m$) holds, then weighted channel estimation signals (At',Bt') are output in accordance with the following equation:

$$(At',Bt') = (At/2^L, Bt/2^L) = (It, Qt) \quad (3)$$

On the other hand, if the amplitudes of the channel estimation signals (It,Qt) are small, i.e., if the reception power P is low and N>0 (L>m) holds, then the weighted channel estimation signals (At',Bt') are output in accordance with the following equation:

$$(At',Bt') = (At/2^{L+N}, Bt/2^{L+N}) = (It/2^N, Qt/2^N) \quad (4)$$

The weighted channel estimation signals (At',Bt') are used at the time of synchronous detection and $2^{-N}$ becomes the weighting coefficient.

Figure 3:
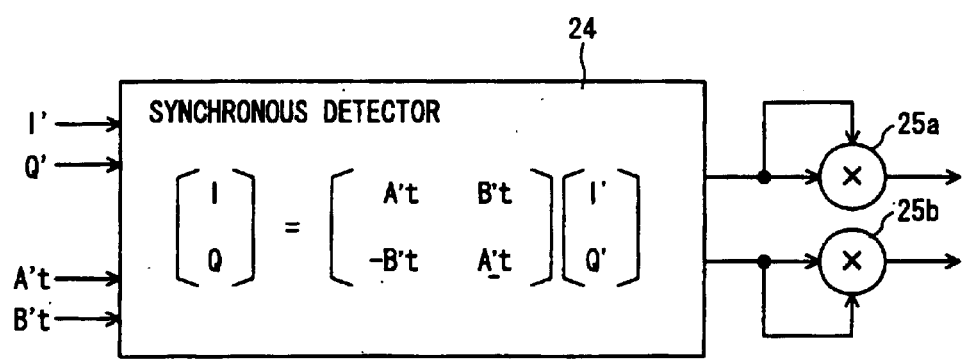
FIG. 3 is a diagram useful in describing a synchronous detection operation.

A synchronous detector 24 performs synchronous detection in accordance with the following equation:

$$\begin{pmatrix} I \\ Q \end{pmatrix} = \begin{pmatrix} At' & Bt' \\ -Bt' & At' \end{pmatrix} \begin{pmatrix} I' \\ Q' \end{pmatrix} \quad (5)$$

using the weighted channel estimation signals (At',Bt'), as shown in FIG. 3. Originally, demodulation of the receive information signals (I,Q) is performed by applying phase-rotation processing to the receive information signals (I',Q') using normalized channel estimation signals (At,Bt) that have not been weighted. According to the present invention, however, the channel estimation signals are weighted by $1/2^N$ and therefore a result multiplied by $1/2^N$ is obtained as the demodulated signals (I,Q) from the synchronous detector 24. Multipliers 25a, 25b thenceforth perform a weighted squaring operation with regard to the I- and Q-components of the demodulated signal in order to implement RAKE combining. As a result, ($It^2/4^N$, $Qt^2/4^N$) is obtained.

Thus, if $L \leq m$ holds, then reception power is high, the corresponding path is considered to be a valid path (weighting coefficient=1) and synchronous detection is performed using (It,Qt) as is. If L>m holds, on the other hand, the reception power is low and whether the corresponding path is a valid path or invalid path is unclear. Accordingly, synchronous detection is performed upon weighting (It,Qt) by 1/2N, which conforms to the difference N between L and m. As a result, with regard to a path for which the valid/invalid path determination cannot be made, a finger output is weighted in accordance with the degree of valid path likeness. A valid path therefore can be rescued and, moreover, an invalid path can be excluded by reducing the weighting of a path that has no valid path likeness. This makes it possible to improve sensitivity and receiver performance.

(b) Input/Output Characteristics of RAKE Receiver

Figure 4:
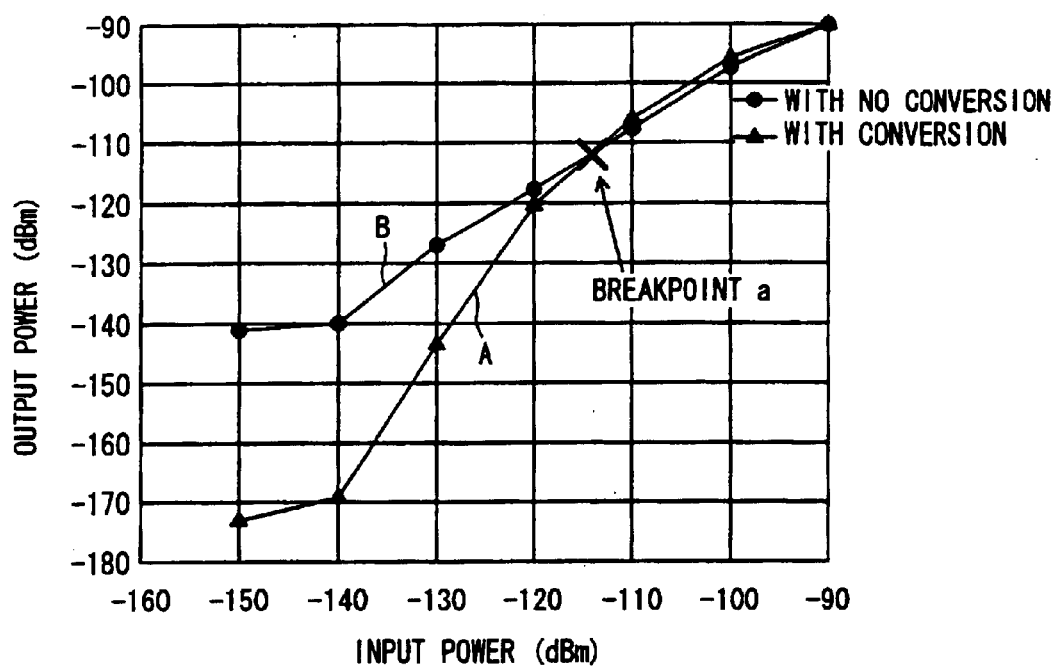
FIG. 4 shows characteristics of a relationship between input power and output power.

FIG. 4 shows the input/output characteristics of a RAKE receiver according to the present invention. These are characteristics for a case where the baseband input after despreading has 10 bits and the breakpoint is at m=4. The horizontal and vertical axes represent input power and output power, respectively. This illustrates a characteristic A for a case where the present invention is used (i.e., weighting is applied) and a characteristic B for a case where the present invention is not used (no weighting applied). Point a is the breakpoint. According to the present invention, the above-described weighting operation is performed with respect to a receive signal below point a. This has the effect of rendering a certain signal more certain and rendering an uncertain signal more uncertain.

(c) Weighting Coefficient

A weighting coefficient is expressed above in a $2^{-N}$ format. This is advantageous in that a weighting coefficient can be obtained by a simple arrangement involving only a bit shift in software processing and hardware implementation. If it is desired to carry out a more detailed setting of weighting coefficient, however, the weighting coefficient can be expressed by $M^{-N}$, where M represents a positive integer and N is a real number. By adopting 3, 4, 5, . . . as M, it is possible to obtain a steeper curve with respect to signals below the breakpoint, and the effect of maximal ratio combining is enhanced.

(d) fdTslot Characteristic

Figure 5:
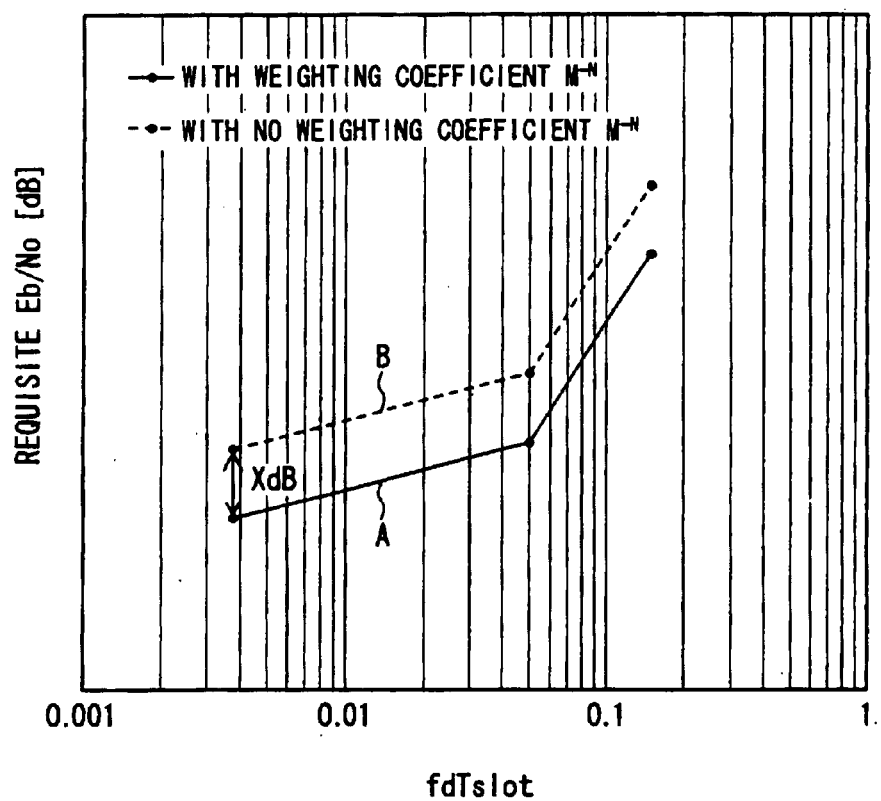
FIG. 5 is an fdTslot characteristic diagram.

FIG. 5 is an fdTslot characteristic diagram, in which the horizontal and vertical axes represents fdTslot (fading) and a requisite Eb/No. A represents a characteristic for a case where weighting processing according to the invention is applied and B represents a characteristic for a case where weighting processing according to the invention is not applied. Characteristic B in a characteristic that prevails when path timing is set from a searcher in order of decreasing reception level and all set paths are combined by a RAKE receiver irrespective of whether a path is valid or invalid. By contrast, characteristic A is one that prevails when a breakpoint is set and a weighting coefficient $M^{-N}$ is applied. By setting a breakpoint, weighting with regard to valid and invalid paths is carried out so that it is possible to obtain a characteristic improvement of X dB.

(e) Diversity Structure

Figure 6:
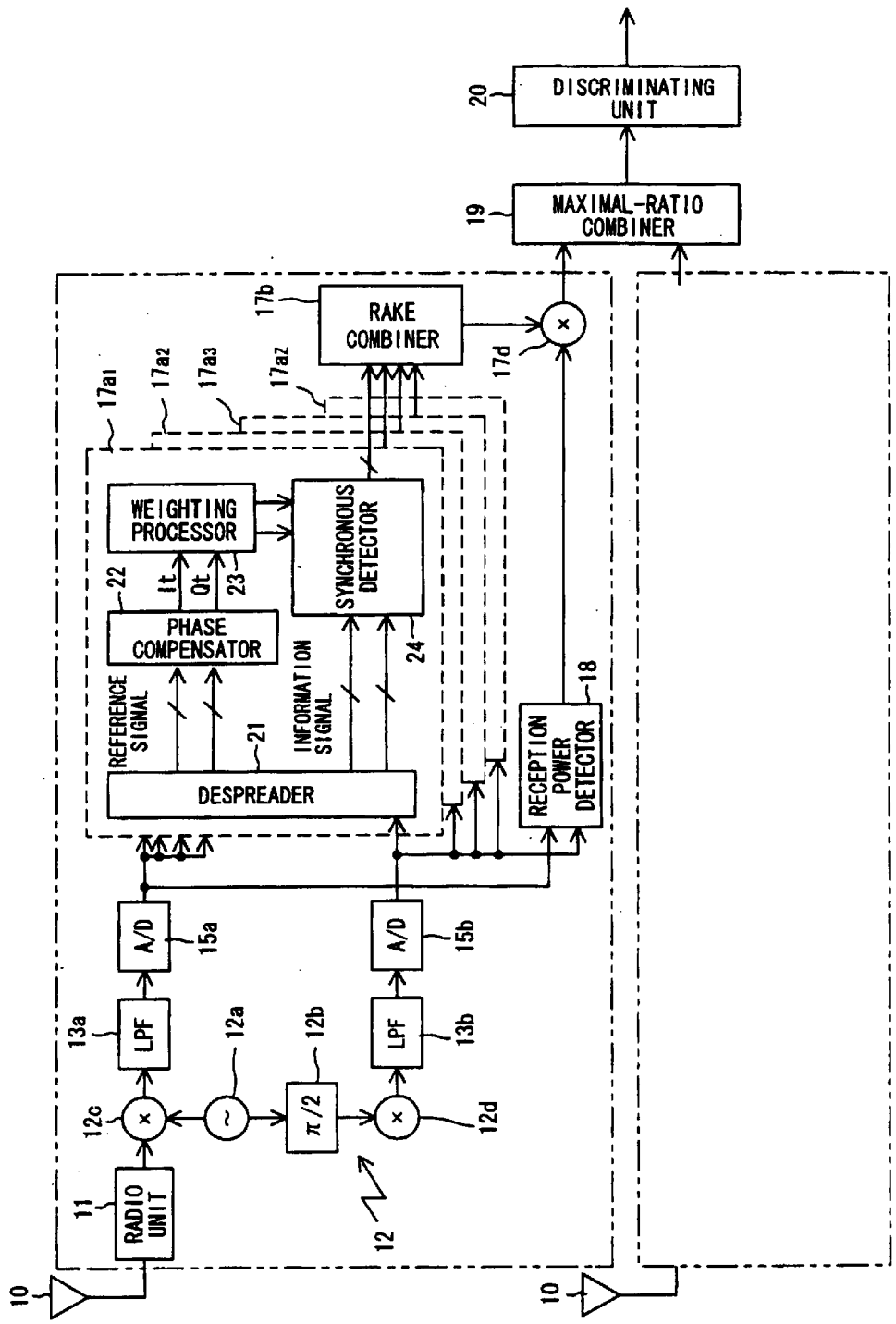
FIG. 6 is a diagram showing the structure of a CDMA receiver composed of a plurality of branches.

FIG. 1 illustrates the structure of a single branch. However, a multiple-branch structure (diversity structure) can be adopted and it is possible to adopt an arrangement in which the outputs from these branches are subjected to maximal ratio combining and data is discriminated based upon the result of combination. FIG. 6 is a diagram showing the structure of a CDMA receiver composed of a plurality of branches. A CDMA receiver similar to that of FIG. 1 is provided for each branch, the outputs of these branches are subjected to maximal ratio combining and data is discriminated. Each branch in FIG. 6 is identically constructed and components identical with those of FIG. 1 are designated by like reference characters. The CDMA receiver of each branch differs from that of FIG. 1 in that (1) the searcher is eliminated; (2) reception power is measured from the output of the AD converter; (3) the RAKE combiner 17b combines the outputs of the fingers as is; and (4) a multiplier 17d is provided and multiplies reception power by combined signal. A maximal ratio combiner 19 combines the outputs of the fingers at a ratio that conforms to the magnitude of reception power, and a discrimination unit 20 performs data discrimination based upon the output of the maximal ratio combiner.

(f) Optimization of Breakpoint

Figure 7:
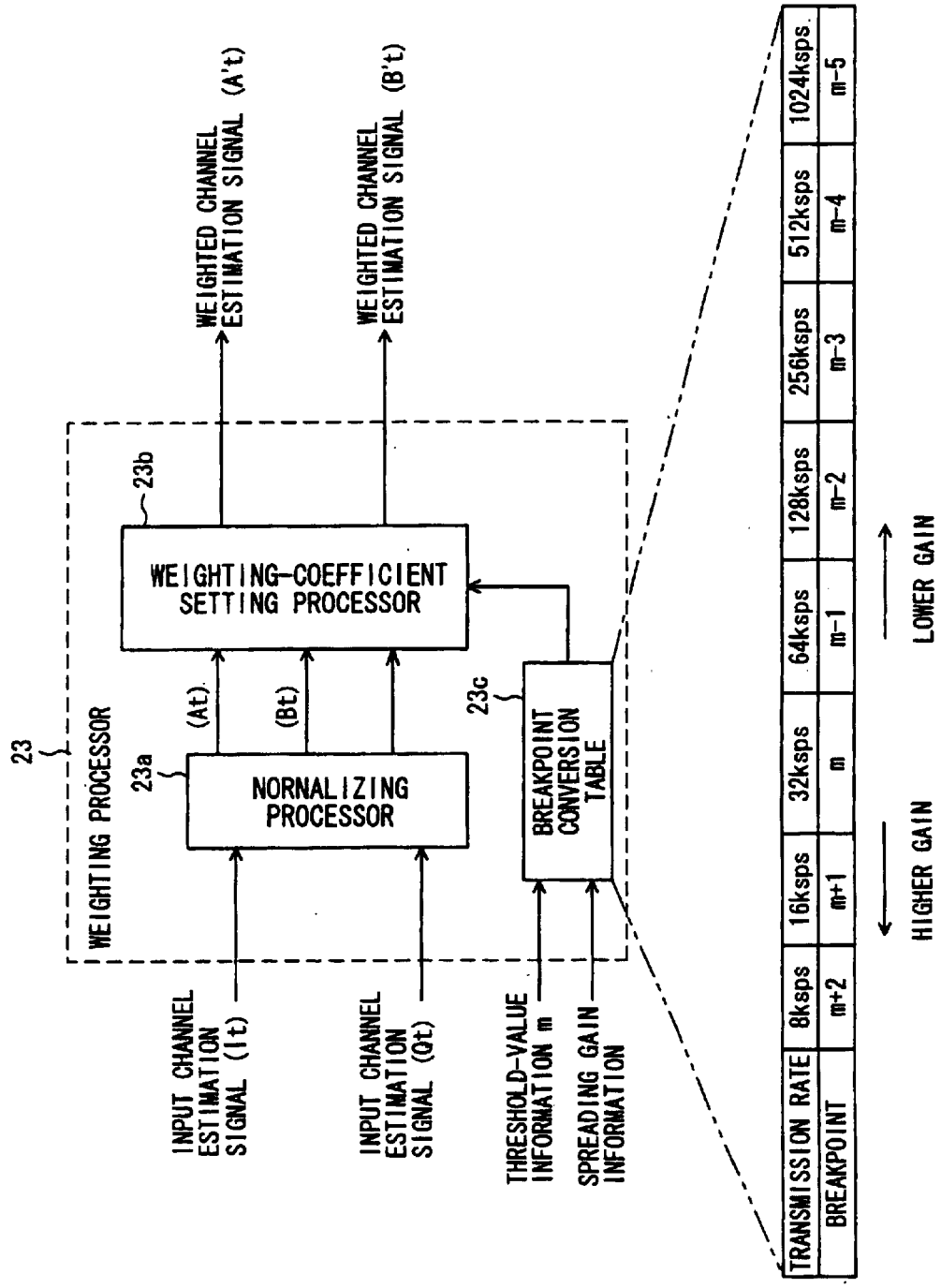
FIG. 7 is a diagram showing the structure of a weighting processor for optimizing a breakpoint by spreading gain.

In a CDMA receiver, it is necessary to set a breakpoint that conforms to spreading gain. In a case where the spreading rate (chip frequency) is 4.096 MHz and the symbol rates are 32 ksps, 64 ksps, 128 ksps, . . . , the spreading gains will be 21 dB, 18 dB, 15 dB, . . . . The higher the spreading gain, the lower the reception level at which a path is regarded as a valid path can be made and the larger m can be made. Accordingly, as shown in FIG. 7, if m represents the breakpoint at a transmission rate of 32 ksps, then breakpoints are set in correspondence with the symbol rates in a breakpoint conversion table 23c. The breakpoint corresponding to the actual symbol rate is read out of the breakpoint conversion table 23c and is set in the weighting-coefficient setting processor 23b.

Since a base station is capable of ascertaining the spreading gain of each individual mobile station, the base station can recognize that there are several current symbol rates. Accordingly, if the current transmission rate of the mobile station is 32 ksps, weighting processing is executed using m as the breakpoint. If the transmission rate of the mobile station changes to 64 ksps, weighting processing is executed using (m+1) as the breakpoint.

(g) Calculation of Reception Power

Figure 8:
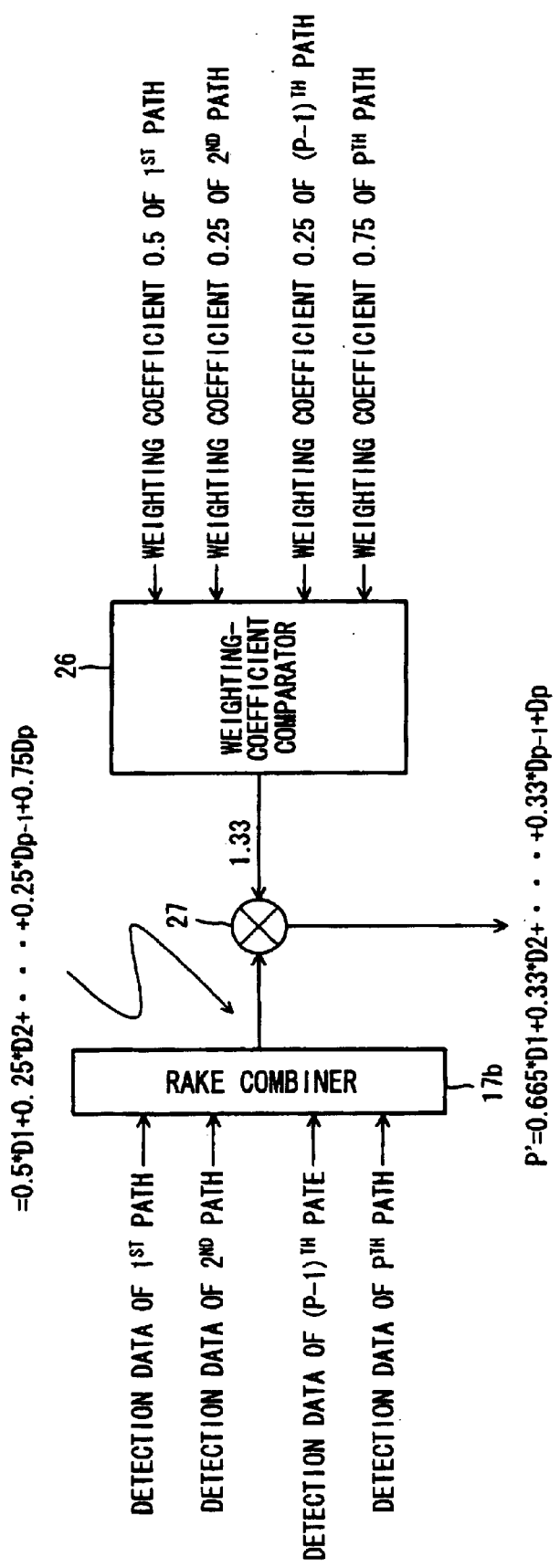
FIG. 8 is a diagram showing an arrangement for calculating reception power.

In a case where RAKE combination is employed using the present invention, weighting is applied and therefore the correct reception power cannot be reported. However, by multiplying the signal after RAKE combination by the reciprocal of the weighting coefficient before combination, it is possible to calculate the value of reception power and a reported value of reception power can be generated. FIG. 8 is a diagram showing an arrangement for calculating reception power. Here the weighting coefficient of a first path is 0.5, that of a second path is 0.25, that of a (P−1)th path is 0.25, and that of a Pth path is 0.75. A weighting-coefficient comparator 26 compares the magnitudes of the weighting coefficients on the respective paths and obtains the largest weighting coefficient (0.75 in the Figure). A multiplier 27 multiplies the RAKE-combined data by the reciprocal (=1.33) of the largest weighting coefficient to obtain an approximate value of reception power. That is, by multiplying the combined signal by the reciprocal of the weighting coefficient for the path having the highest degree of certainty, an approximate value of reception power can be calculated in a simple manner.

(B) Weighting Processor (a) First Embodiment of Weighting Processor

Figure 9:
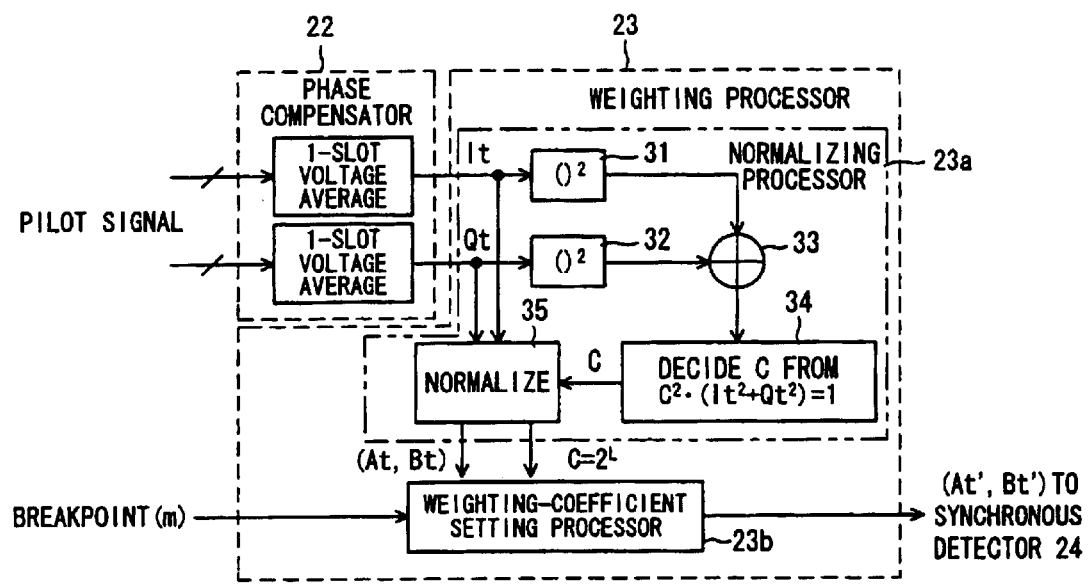
FIG. 9 is a diagram showing the structure of a phase compensation unit and weighting processor.
Figure 10:
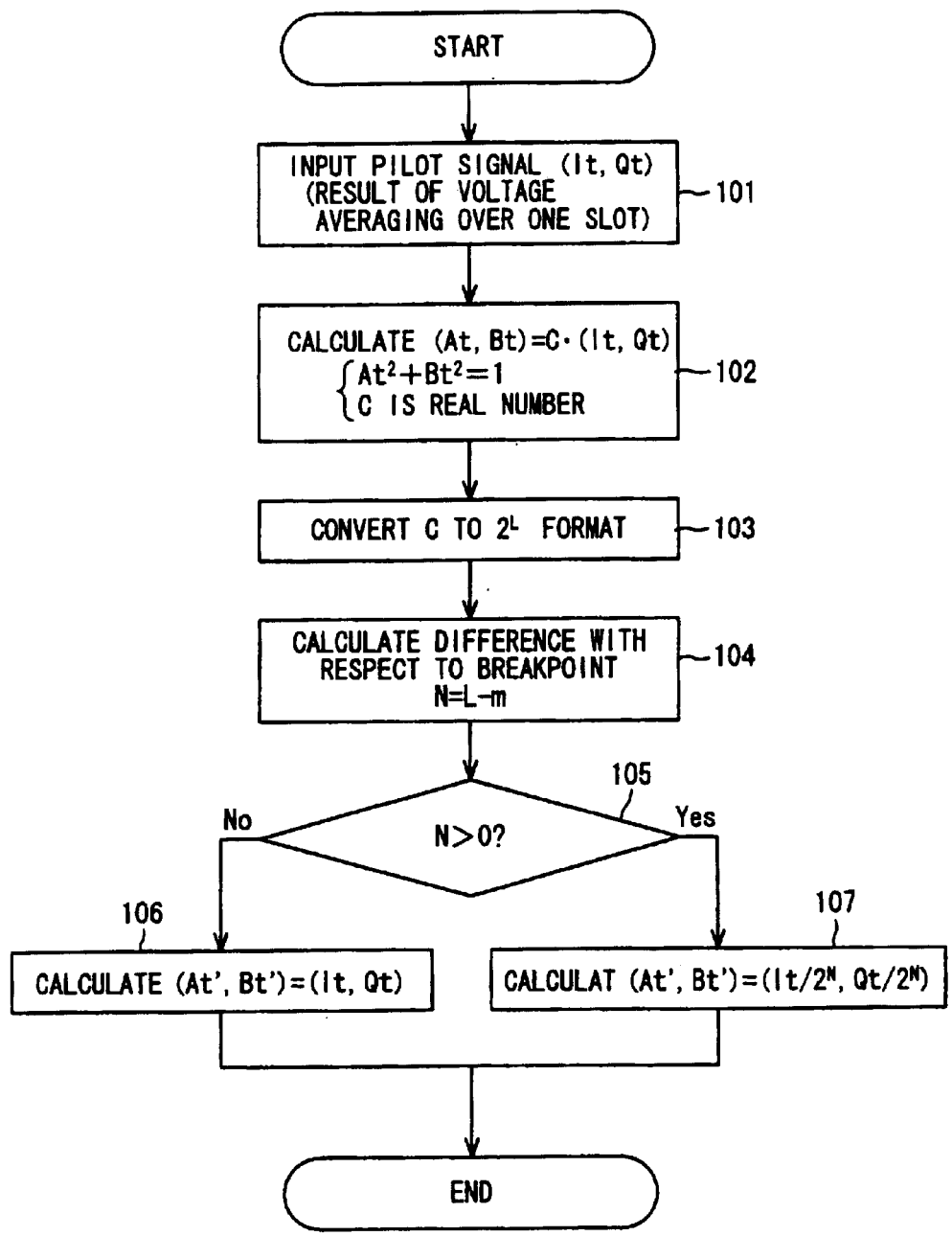
FIG. 10 is a flowchart of processing for deciding a weighted channel estimation signal.

FIG. 9 is a diagram showing the structure of a first embodiment of the weighting processor 23 of FIG. 1. This sets a weighting coefficient using a pilot signal. The phase compensator 22 and weighting processor 23 are illustrated. FIG. 10 is a flowchart of processing for generating a weighted channel estimation signal.

The phase compensator 22 averages the voltages of the I- and Q-components of the pilot signal over one slot and outputs channel estimation signals (It, Qt) (step 101). The normalizing processor 23a includes multipliers 31, 32 for performing the operations $It^2$, $Qt^2$ when the channel estimation signals (It, Qt) are input thereto, an adder 33 adds $It^2$ and $Qt^2$, a multiple deciding unit 34 finds the multiple C that satisfies the following equation:

$$C^2 \cdot (It^2 + Qt^2) = 1 \qquad (1)'$$

and a normalization arithmetic unit 35 finds the normalized channel estimation signals At, Bt ($At^2 + Bt^2 = 1$) in accordance with Equation (2) (step 102).

Next, normalization arithmetic unit 35 converts C to the $2^L$ format and inputs At, Bt, L to the weighting-coefficient setting processor 23b (step 103). The weighting-coefficient setting processor 23b executes weighting processing using the entered L and channel estimation signals (At, Bt) as well as the separately set breakpoint m. Specifically, the weighting-coefficient setting processor 23b performs the operation N=L−m and discriminates the sign of N (steps 104, 105). If N≦0 holds, i.e., if reception power is high, the weighting-coefficient setting processor 23b outputs the weighted channel estimation signals (At',Bt')=(It,Qt) in accordance with Equation (3) (step 106). If the reception power is low and N>0 (L>m) holds, on the other hand, then the weighting-coefficient setting processor 23b outputs the weighted channel estimation signals (At',Bt')=(It/$2^N$, Qt/$2^N$) in accordance with Equation (4) (step 107). The synchronous detector 24 performs synchronous detection using these weighted channel estimation signals (At',Bt').

FIG. 11 is an example of actual numerical values in a case where the normalized channel estimation signals (At, Bt), multiple C (=$2^L$), N(=L−m) and weighted channel estimation signals (At',Bt') are found in accordance with the processing flowchart of FIG. 10 when It=0.0271, Qt=0.0156, M=2, m=4 hold.

(b) Second Embodiment of Weighted Processor

Figure 12:
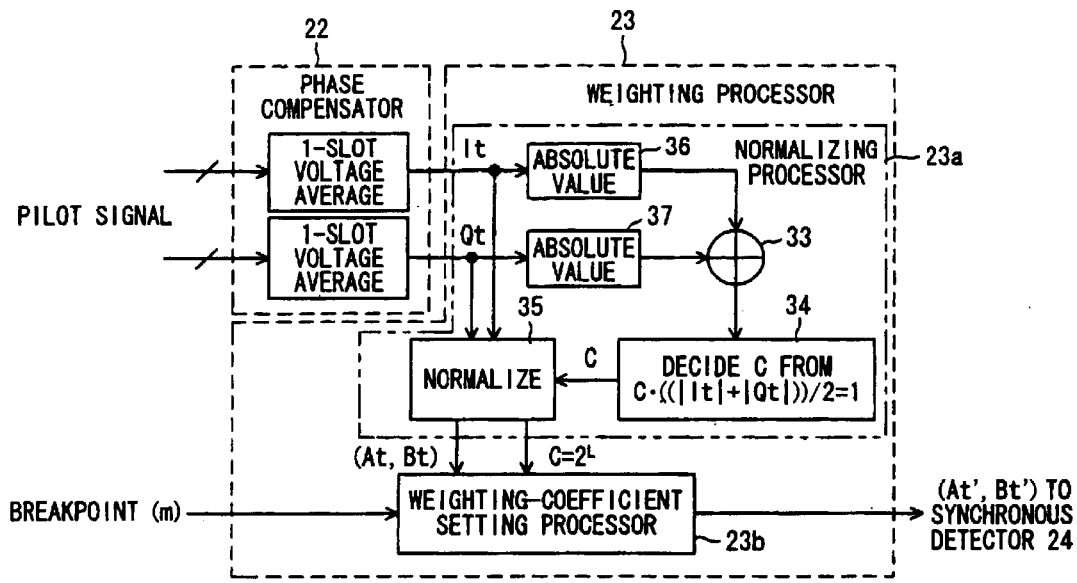
FIG. 12 is a diagram showing another structure of a weighting processor.

FIG. 12 is a diagram showing the structure of a second embodiment of the weighting processor 23 of FIG. 1. In order to simplify the circuitry, this embodiment is such that the absolute values of the It and Qt components are calculated and the multiple C is decided in approximate fashion utilizing the average of the absolute values.

The phase compensator 22 averages the voltages of the I- and Q-components of the pilot signal over one slot and outputs channel estimation signals (It, Qt), and absolute-value calculation units 36, 37 of the normalizing processor 23a calculate absolute values |It|, |Qt| when the channel estimation signals (It, Qt) are input thereto. The adder 23 adds |It| and |Qt| and the multiple deciding unit 34 finds the multiple C that satisfies the following equation:

$$C \cdot (|It|+|Qt|)/2=1 \quad (6)$$

That is, the multiple deciding unit 34 finds the multiple C that makes the average of the absolute values equal to one. Next, the normalization arithmetic unit 35 finds the normalized channel estimation signals At, Bt in accordance with the following equation:

$$(At, Bt) = C(It, Qt)$$

converts C to the $2^L$ format and inputs A, Bt, L to the weighting-coefficient setting processor 23b. By processing similar to that of the first embodiment, the weighting-coefficient setting processor 23b outputs the weighted channel estimation signals (At',Bt').

(c) Third Embodiment of Weighting Processor

Figure 13:
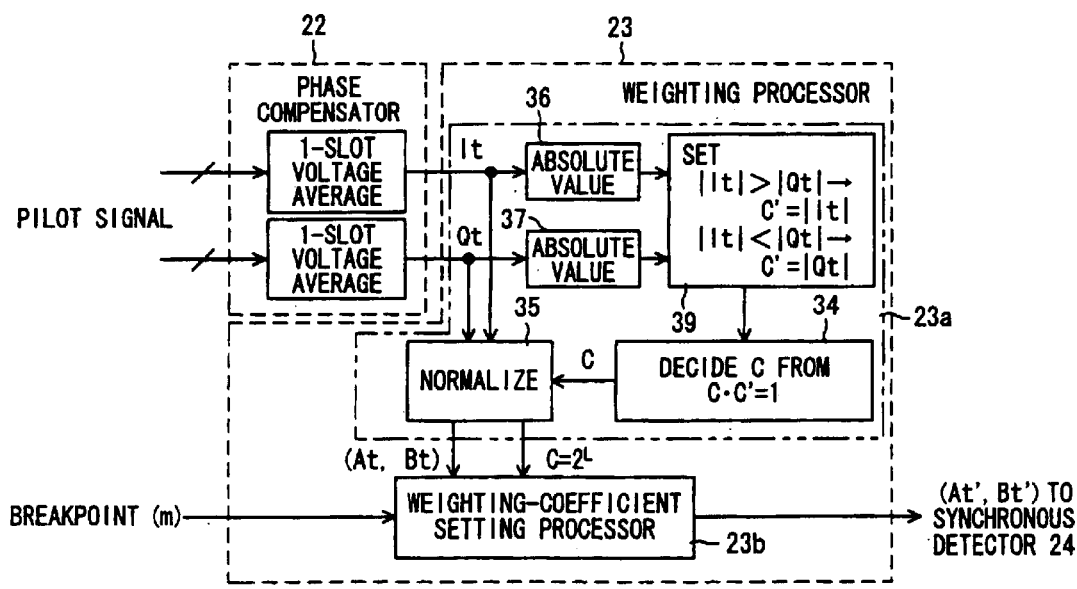
FIG. 13 is a diagram showing yet another structure of a weighting processor.

FIG. 13 is a diagram showing the structure of a third embodiment of the weighting processor 23 of FIG. 1. In order to simplify the circuitry, this embodiment is such that the absolute values of the It and Qt components are calculated and the multiple C is decided in approximate fashion utilizing the larger of the absolute values.

The phase compensator 22 averages the voltages of the I- and Q-components of the pilot signal over one slot and outputs channel estimation signals (It, Qt), and the absolute-value calculation units 36, 37 of the normalizing processor 23a calculate absolute values |It|, |Qt| when the channel estimation signals (It, Qt) are input thereto. An absolute-value selector 39 outputs the larger of the absolute values as C' and the multiple deciding unit 34 finds the multiple C that satisfies the following equation:

$$C \cdot C' = 1 \quad (7)$$

That is, the multiple deciding unit 34 finds the multiple C that will make the larger of the absolute values equal to one. Next, the normalization arithmetic unit 35 finds the normalized channel estimation signals At, Bt in accordance with the following equation:

$$(At, Bt) = C(It, Qt)$$

converts C to the $2^L$ format and inputs A, Bt, L to the weighting-coefficient setting processor 23b. By processing similar to that of the first embodiment, the weighting-coefficient setting processor 23b outputs the weighted channel estimation signals (At',Bt').

(d) Average Over Plurality of Slots

Figure 14:
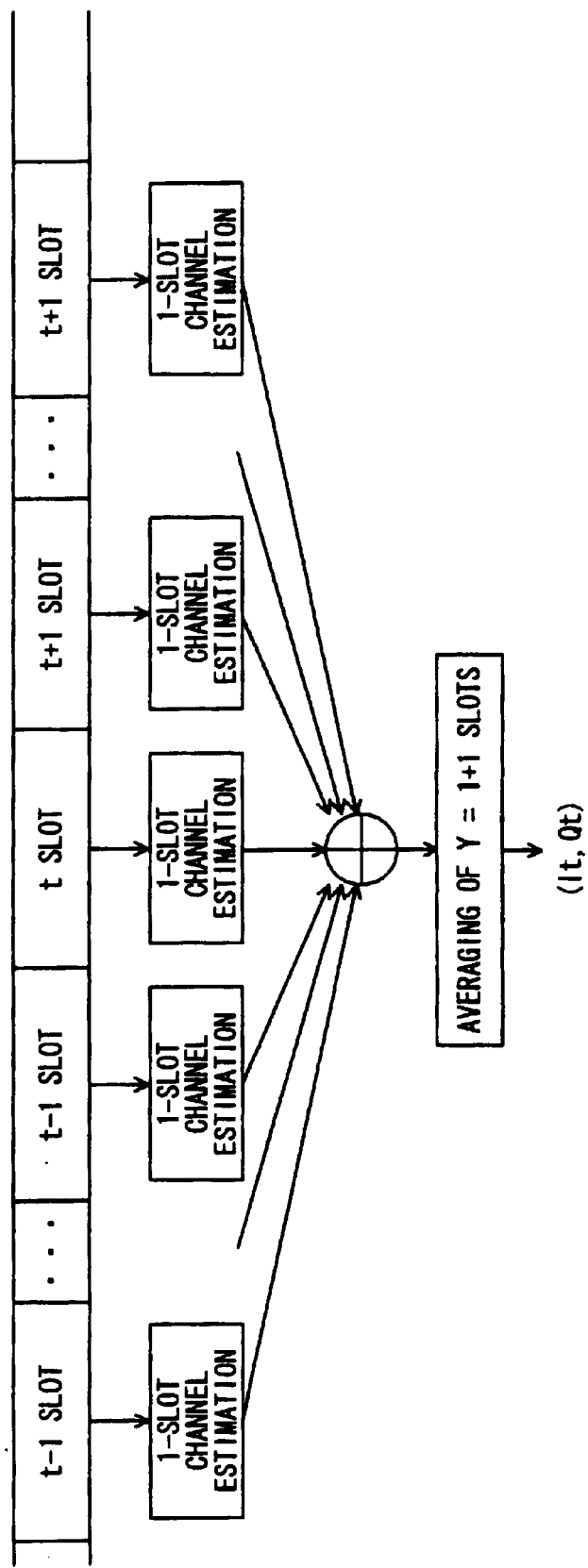
FIG. 14 is a diagram useful in describing a running mean of Y slots of a channel estimation signal.

In the first to third embodiments of weighting processor 23, a voltage average of the pilot signal over one slot is output as the channel estimation signals (It,Qt). However, the pilot signal can be averaged over a plurality of slots and the average can be adopted as the channel estimation signals (It,Qt). FIG. 14 shows an example in which the average value not over one slot but over Y (1, 3, 5 . . . ) slots is adopted as the channel estimation signals (It,Qt). The average value over a plurality of slots having symmetry with respect to the local slot is calculated and output.

(e) Other Structure of Weighting Processor

The foregoing is for a case where the breakpoint is m, the multiple is C ($=2^L$), the operation N=L−m is performed, weighting is made 1 if N≦0 holds and $1/2^N$ if N>0 holds. In the first embodiment of the weighting processor, C is a multiple that satisfies the following equation;

$$C \cdot (It^2 + Qt^2)^{1/2} = 1 \quad (1)$$

Since reception power $P = It^2 + Qt^2$, C is a multiple that satisfies $$C^2 \cdot P = 1$$

If P is found by substituting $C = 2^L$ into the above equation, we have $$P = 1/4^L$$

Since L=m is the breakpoint at the boundary of a valid path and invalid path, the breakpoint level of reception power becomes $1/4^m$. Accordingly, the weighting processor 23 can be constructed in such a manner that if reception power P is greater than $1/4^m$, the path is a valid path and the weighting is made 1, and such that if $P < 1/4^m$ holds, the smaller the value of P, the smaller the weighting becomes.

More specifically, in general, a predetermined reception power Pm is set as the breakpoint level and the weighting processor 23 can be constructed in such a manner that if the actual reception power P is greater than the breakpoint level (set power) Pm, the weighting is made 1, and such that if P<Pm holds, the smaller the value of P, the smaller the weighting becomes.

(f) Other Structure of Weighting Processor

It is also possible to construct the weighting processor 23 in such a manner that when the predetermined reception power Pm is set as the breakpoint level, the weighting coefficient is decided based upon the ratio between the reception power P and breakpoint level Pm. Specifically, the weighting processor 23 finds the multiple C that satisfies $$Pm = C \cdot P$$

finds the normalized channel estimation signals At, Bt in accordance with the following equation:

$$(At, Bt) = C(It, Qt)$$

and converts C to the $2^L$ format. If reception power P increases, C decreases, and if reception power P decreases, C increases.

The weighting processor 23 executes weighting processing in accordance with L obtained by the $2^L$ conversion, the channel estimation signals (At, Bt) and the separately set breakpoint m. That is, the weighting processor 23 first compares L and the breakpoint m. This comparison processing is executed by performing the operation N=L−m and discriminating the sign thereof. If the reception power P is high and N≦0 (L≦m) holds, then the weighted channel estimation signals (At',Bt') are output in accordance with the following equation:

$$(At', Bt') = (At/2^L, Bt/2^L) = (It, Qt)$$

On the other hand, if the reception power is low and N>0 (L>m) holds, then the weighted channel estimation signals (At',Bt') are output in accordance with the following equation:

$$(At', Bt') = (At/2^{L+N}, Bt/2^{L+N}) = (It/2^N, Qt/2^N)$$

(C) Embodiment in Case Where Weighting is Performed After Synchronous Detection

In the embodiment set forth above, weighting is applied to channel estimation signals and weighted multiplication is carried out in the synchronous detector. However, weighting can be applied by multiplying the output signal of the synchronous detector by a weighting coefficient.

(a) Overall Construction

Figure 15:
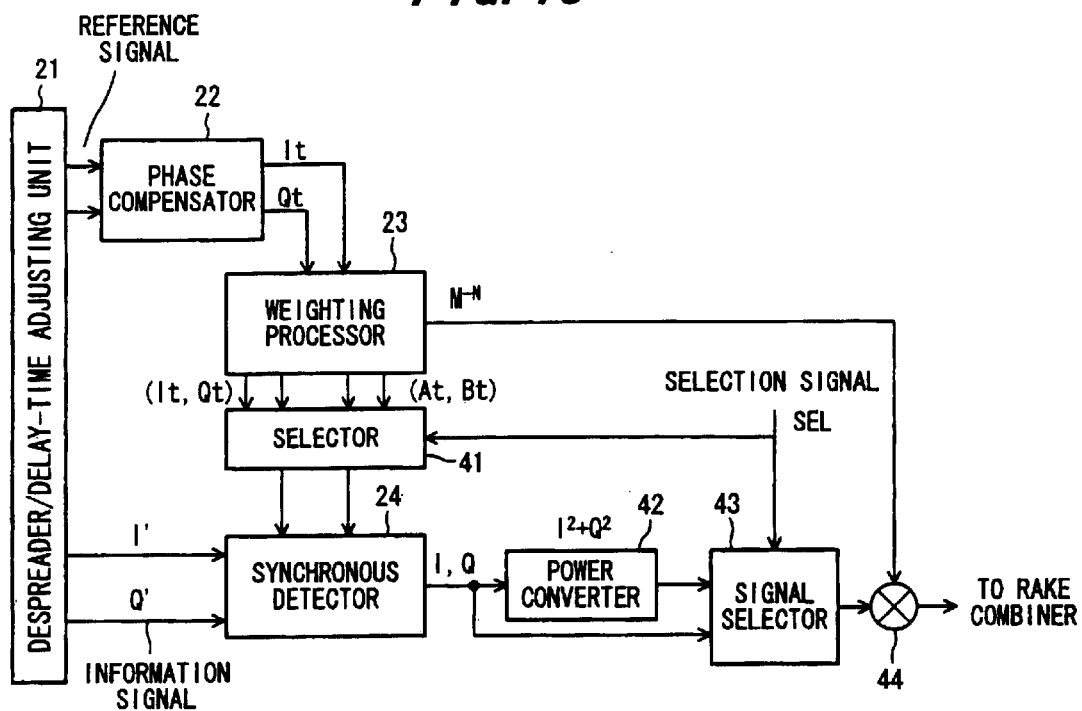
FIG. 15 is a diagram showing the structure of a finger in a case where weighting is performed after synchronous detection.

FIG. 15 is a diagram showing the structure of a finger in a case where weighting is performed after synchronous detection. Only one path is illustrated. The despreader/delay-time adjusting unit 21 subjects a direct wave or delayed wave that arrives via a prescribed path to despread processing using a code identical with the spreading code, performs dump integration, then applies delay processing conforming to the path and outputs two types of signals, namely a pilot signal (reference signal) and information signal. The phase compensator 22 averages the voltages of the I- and Q-components of the pilot signal over a prescribed number of slots and outputs channel estimation signals It, Qt.

The weighting processor 23 subjects the entered estimation channel signals (It,Qt) to normalization processing and outputs normalized channel estimation signals (At, Bt) and the channel estimation signals (It, Qt) prior to normalization to a selector 41. Normalization processing is performed by a method similar to that of normalization processing described in conjunction with FIG. 1. Specifically, the weighting processor 23 obtains a multiple C that satisfies the following equation:

$$C \cdot (It^2 + Qt^2)^{1/2} = 1$$

and obtains normalized channel estimation signals At, Bt ($At^2 + Bt^2 = 1$) in accordance with the following equation:

$$(At, Bt) = C(It, Qt)$$

Further, the weighting processor 23 converts the multiple C to a $2^L$ format, decides a weighting coefficient $M^{-N}$ in accordance with the L obtained by the conversion and a separately set breakpoint m, and outputs the weighting coefficient.

In accordance with a selection signal SEL, the selector 41 selects and outputs the normalized channel estimation signals (At, Bt) or the channel estimation signals (It, Qt) prior to normalization. The synchronous detector 24 performs synchronous detection in accordance with the following equation:

$$\begin{pmatrix} I \\ Q \end{pmatrix} = \begin{pmatrix} At & Bt \\ -Bt & At \end{pmatrix} \begin{pmatrix} I' \\ Q' \end{pmatrix} \quad (5)'$$

or the following equation:

$$\begin{pmatrix} I \\ Q \end{pmatrix} = \begin{pmatrix} It & Qt \\ -Qt & It \end{pmatrix} \begin{pmatrix} I' \\ Q' \end{pmatrix} \quad (5)''$$

using the weighted channel estimation signals selected by the selector 41. In a case where the normalized channel estimation signals (At, Bt) are used in synchronous detection, these channel estimation signals (At, Bt) merely contain phase information. Accordingly, synchronous detection applies only phase-rotation processing to the information signal, and the output signal after synchronous detection becomes voltage information. In such case, if it is necessary to perform maximal ratio combining at a latter stage, it is required that a power converter 42 convert the voltage information to power information in accordance with the following equation:

$$P = I^2 + Q^2$$

On the other hand, if the channel estimation signals (It, Qt) prior to normalization are used in synchronous detection, the channel estimation signals (It, Qt) contain not only phase information but also amplitude information. When synchronous detection is performed, therefore, the amplitude of the channel estimation signals and the amplitude of the detected information signal are multiplied. As a result, a power-converted synchronous detection signal is output from the synchronous detector 24 and therefore the intervention of the power converter 42 is unnecessary. A signal selector 43 selects the output of the power converter 42 or the output of the synchronous detector 24 based upon the selection signal SEL and inputs the selected output to a multiplier 44. That is, in a case where synchronous detection is performed using the normalized channel estimation signals (At, Bt), the signal selector 43 selects the output of the power converter 42 and inputs this to the multiplier 44. In a case where synchronous detection is performed using the channel estimation signals (It, Qt) prior to normalization, the signal selector 43 selects the output of the synchronous detector 24 and inputs it to the multiplier 44.

The multiplier 44 multiplies the data prevailing after synchronous detection output from the signal selector 43 by the weighting coefficient $M^{-N}$ output from the weighting processor 23 and inputs the product to the maximal ratio combiner.

(b) First Embodiment of Weighting Processor

Figure 16:
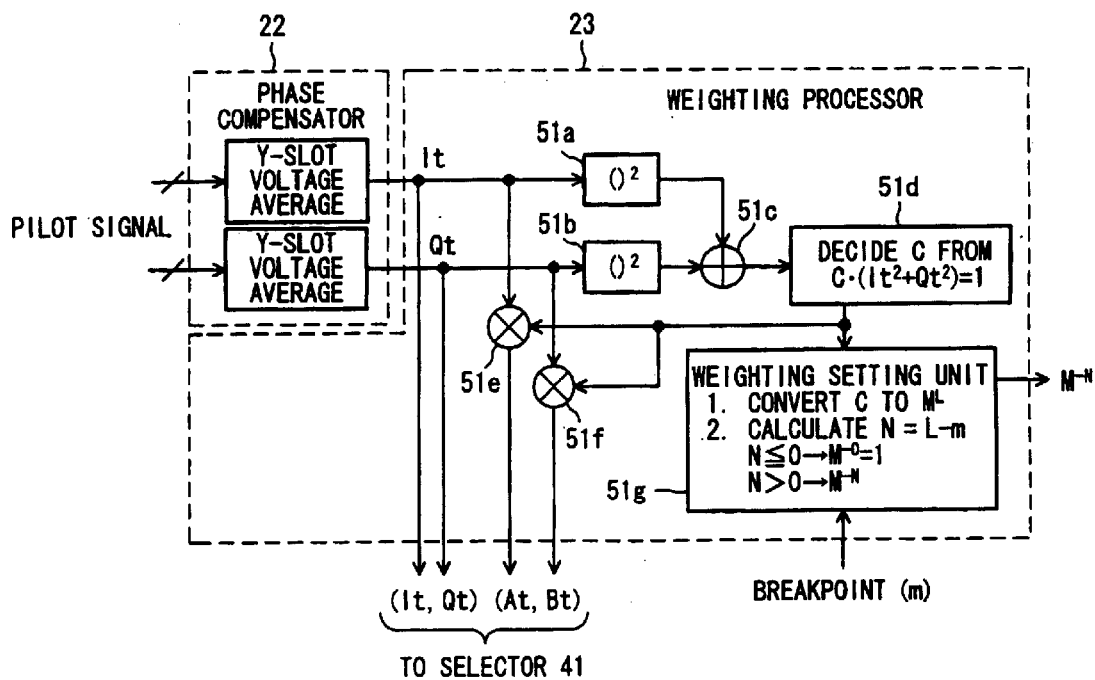
FIG. 16 is a first embodiment of the weighting processor of FIG. 15.

FIG. 16 is a diagram showing the structure of a first embodiment of the weighting processor 23 of FIG. 15. This sets a weighting coefficient using a pilot signal. The phase compensator 22 and weighting processor 23 are illustrated.

The phase compensator 22 averages the voltages of the I- and Q-components of the pilot signal over Y slots and outputs channel estimation signals (It, Qt). Multipliers 51a, 51b perform the operations $It^2$, $Qt^2$ when the channel estimation signals (It, Qt) are input thereto, an adder 51c adds $It^2$ and $Qt^2$, and a multiple deciding unit 51d finds the multiple C that satisfies the following equation:

$$C^2 \cdot (It^2 + Qt^2) = 1$$

Multipliers 51e, 51f calculate the normalized channel estimation signals At, Bt ($At^2 + Bt^2 = 1$) in accordance with the following equation:

$$(At, Bt) = C(It, Qt)$$

and inputs these to the selector 41 together with the channel estimation signals (It, Qt). A weighting setting unit 51g converts C to the ML format (e.g., M=2) and executes weighting processing using L and the separately set breakpoint m. Specifically, the weighting setting unit 51g performs the operation N=L−m and discriminates the sign of N. If N≦0 (L≦m) holds, the weighting setting unit 51g outputs $M^0$ (=1) as the weighting coefficient; if N>0 (L>m) holds, the weighting setting unit 51g outputs $M^{-N}$ as the weighting coefficient.

(c) Second Embodiment of Weighting Processor

Figure 17:
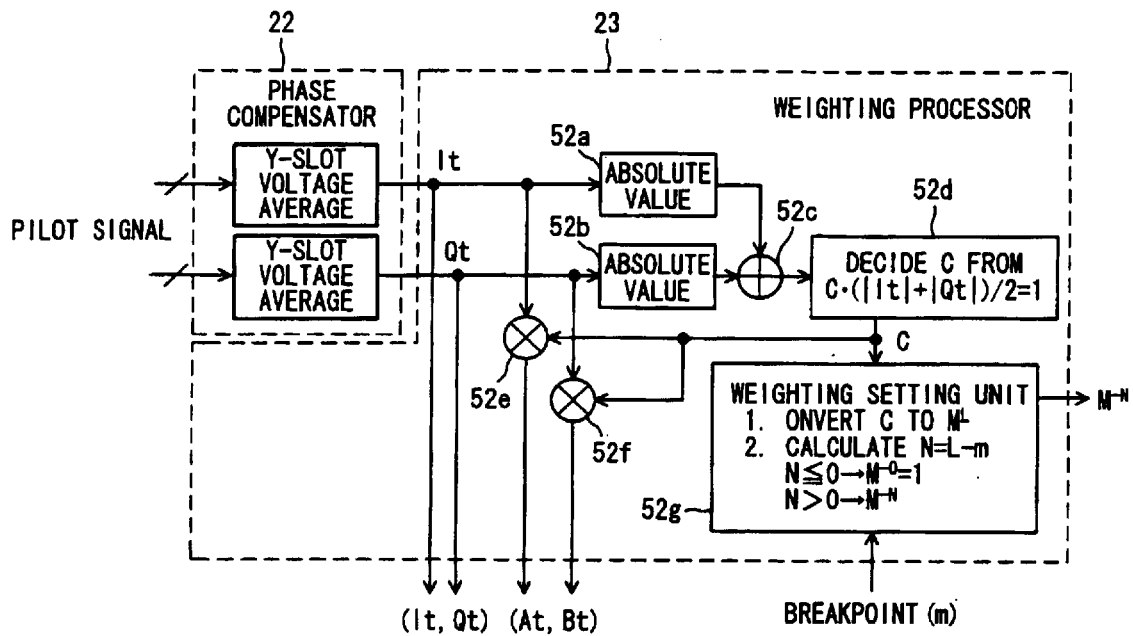
FIG. 17 is a second embodiment of the weighting processor of FIG. 15.

FIG. 17 is a diagram showing the structure of a second embodiment of the weighting processor 23 of FIG. 15. In order to simplify the circuitry, this embodiment is such that the absolute values of the It and Qt components are calculated and the multiple C is decided in approximate fashion utilizing the average of the absolute values.

The phase compensator 22 averages the voltages of the I- and Q-components of the pilot signal over Y slots and outputs channel estimation signals (It, Qt). Absolute-value calculation units 52a, 52b calculate absolute values |It|, |Qt| when the channel estimation signals (It, Qt) are input thereto. An adder 52c adds |It| and |Qt| and a multiple deciding unit 52d finds the multiple C that satisfies the following equation:

$$C \cdot (|It|+|Qt|)/2=1$$

That is, the multiple deciding unit 52d finds the multiple C that makes the average of the absolute values equal to one. Next, multipliers 52e, 52f calculate the normalized channel estimation signals At, Bt in accordance with the following equation:

$$(At, Bt)=C(It, Qt)$$

and input the products to the selector 41 together with the channel estimation signals (It, Qt). A weighting setting unit 52g executes processing similar to that of the weighting setting unit 51g of the first embodiment, decides the weighting coefficient $M^{-N}$ and outputs the same.

(c) Third Embodiment of Weighting Processor

Figure 18:
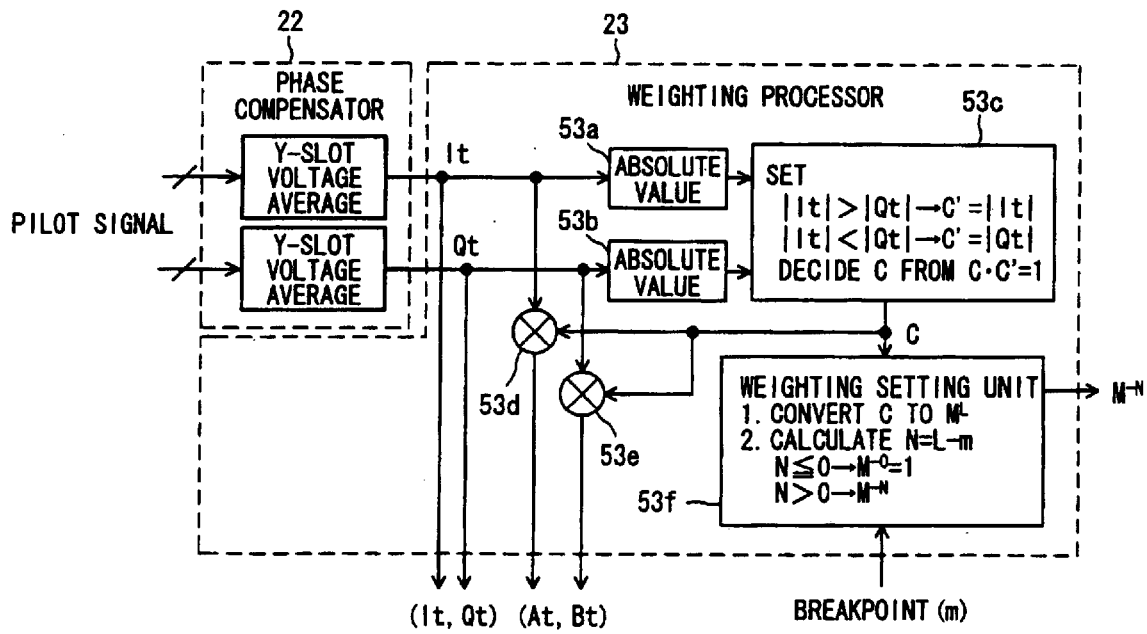
FIG. 18 is a third embodiment of the weighting processor of FIG. 15.

FIG. 18 is a diagram showing the structure of a third embodiment of the weighting processor 23 of FIG. 15. In order to simplify the circuitry, this embodiment is such that the absolute values of the It and Qt components are calculated and the multiple C is decided in approximate fashion utilizing the larger of the absolute values.

The phase compensator 22 averages the voltages of the I- and Q-components of the pilot signal over Y slots and outputs channel estimation signals (It, Qt). Absolute-value calculation units 53a, 53b calculate absolute values |It|, |Qt| when the channel estimation signals (It, Qt) are input thereto. A multiple deciding unit 53c adopts the larger of the absolute values as C' and finds the multiple C that satisfies the following equation:

$$C \cdot C'=1$$

Next, multipliers 53d, 53e calculate the normalized channel estimation signals At, Bt in accordance with the following equation:

$$(At, Bt)=C(It, Qt)$$

and input the products to the selector 41 together with the channel estimation signals (It, Qt). A weighting setting unit 53f executes processing similar to that of the weighting setting unit 51g of the first embodiment, decides the weighting coefficient $M^{-N}$ and outputs the same.

(D) Embodiment in Which Breakpoint is Set by SIR (a) Structure and Operation

Figure 19:
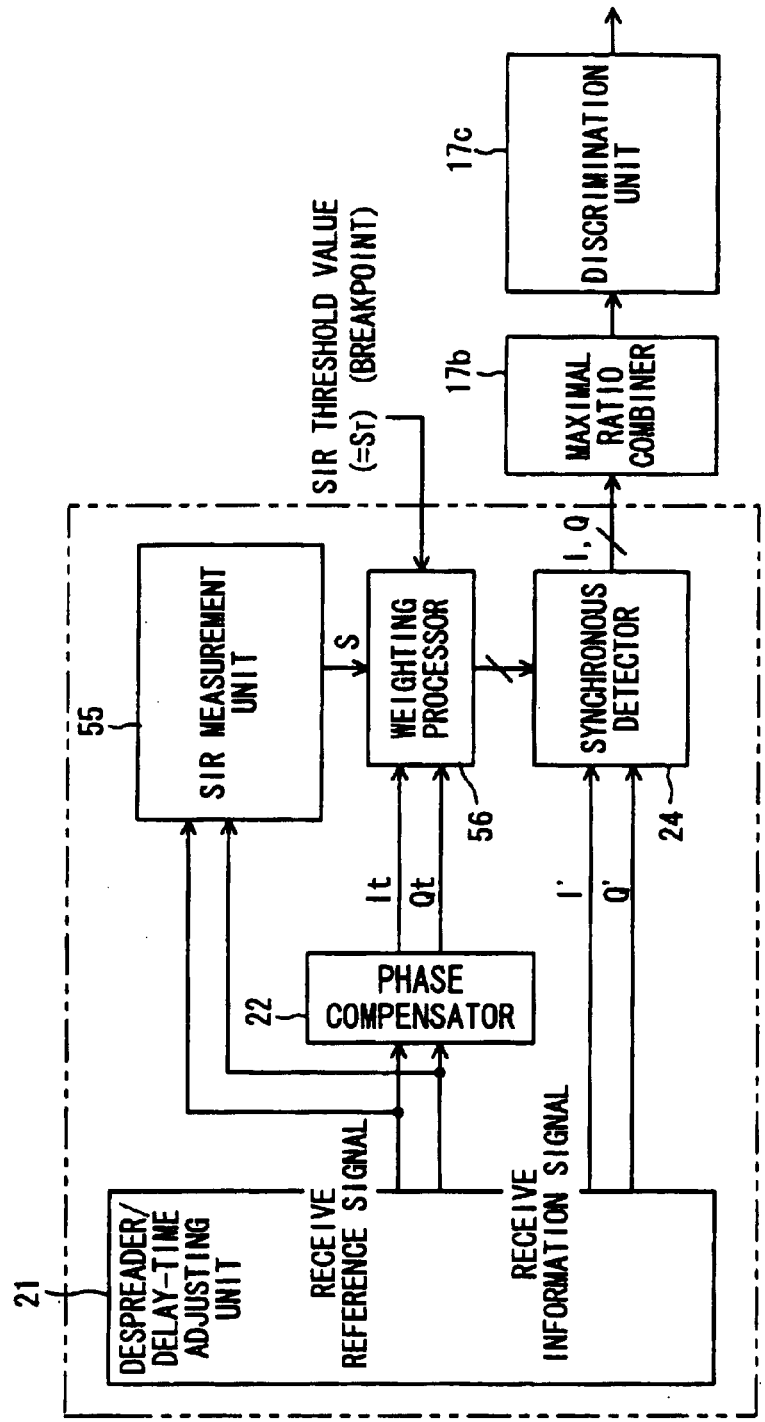
FIG. 19 is a diagram showing the structure of a finger in a case where breakpoint is set by a SIR.
Figure 20:
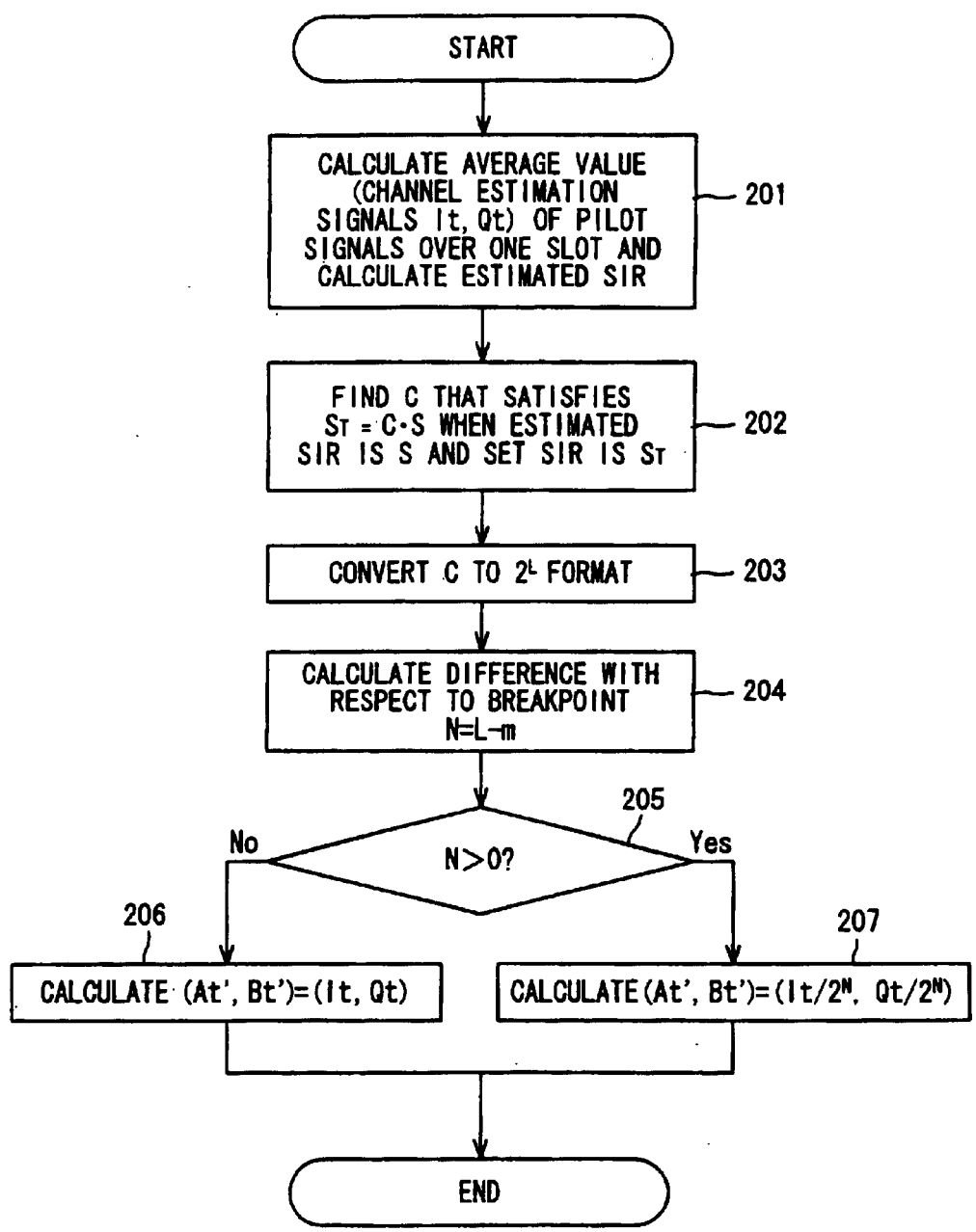
FIG. 20 is a flowchart of processing for deciding a weighted channel estimation signal using an estimated SIR and a set SIR.

FIG. 19 is a diagram showing the structure of a finger in a case where breakpoint is set by a SIR. This illustrates only the structure of one finger. FIG. 20 is a flowchart of processing for outputting a weighted channel estimation signal using a set SIR and an estimated SIR. A SIR value ST for obtaining an error rate $10^{-3}$ after error correction is set in advance.

The despreader/delay-time adjusting unit 21 subjects a direct wave or delayed wave that arrives via a prescribed path to despread processing using a code identical with the spreading code, performs dump integration, then applies delay processing conforming to the path and outputs two types of signals, namely a pilot signal and information signal. The phase compensator 22 averages the voltages of the I- and Q-components of the pilot signal over a prescribed number of slots and outputs channel estimation signals It, Qt. An SIR estimation unit 55 estimates an SIR (=S) by a method described below (step 201). A weighting processor 56 finds the multiple C that satisfies the following equation (step 202):

$$S_T = C \cdot S$$

finds the normalized channel estimation signals At, Bt in accordance with the following equation:

$$(At, Bt)=C(It, Qt)$$

and converts C to the $2^L$ format (step 203). If the estimated SIR increases, C decreases; if the estimated SIR decreases, C increases.

The weighting processor 56 executes weighting processing in accordance with the L obtained by the $2^L$ conversion, the channel estimation signals (At, Bt) and the separately set threshold value (breakpoint) m. That is, the weighting processor 56 compares L with the breakpoint m. This comparison processing is implemented by performing the operation N=L−m and then discriminating the sign thereof (steps 204, 205). If the estimated SIR is large and N≦0 (L≦m) holds, then weighted channel estimation signals (At',Bt') are output (step 206) in accordance with the following equation:

$$(At',Bt')=(At/2^L, Bt/2^L)=(It, Qt)$$

If the estimated SIR is small and N>0 (L>m) holds, then the weighted channel estimation signals (At',Bt') are output (step 207) in accordance with the following equation:

$$(At',Bt')=(At/2^{L+N}, Bt/2^{L+N})=(It/2^N, Qt/2^N)$$

The weighted channel estimation signals (At',Bt') are used at the time of synchronous detection and $2^{-N}$ becomes the weighting coefficient.

A synchronous detector 24 performs synchronous detection in accordance with the following equation:

$$\begin{pmatrix} I \\ Q \end{pmatrix} = \begin{pmatrix} At' & Bt' \\ -Bt' & At' \end{pmatrix} \begin{pmatrix} I' \\ Q' \end{pmatrix} \quad (5)$$

using the weighted channel estimation signals (At',Bt').

(b) Weighting Coefficient

Though the weighting coefficient is expressed above in a $2^{-N}$ format, the weighting coefficient can be expressed by $M^{-N}$, where M represents a positive integer and N is a real number. By adopting 3, 4, 5, . . . as M, it is possible to obtain a steeper curve with respect to signals below the breakpoint, and the effect of maximal ratio combination is enhanced.

(c) Other Structure of Weighting Processor

The foregoing is for a case where the breakpoint is m, the multiple is $2^L$ (=C), the operation N=L−m is performed, weighting is made 1 if N≦0 holds and 1/2N if N>0 holds. Here C is a multiple that satisfies the following equation:

$$C \cdot S = S_T$$

Accordingly, if S is found by substituting $C=2^L$ into the above equation, we have $$S = S_T/2^L$$

Since L=m is the breakpoint at the boundary of a valid path and invalid path, the breakpoint level of SCR becomes $S_T/2^m$. Accordingly, the weighting processor 23 can be constructed in such a manner that if estimated SCR is greater than $S_T/2^m$, the path is a valid path and the weighting is made 1, and such that if $S<S_T/2^m$ holds, the smaller the value of estimated SIR, the smaller the weighting becomes.

More specifically, in general, a predetermined SIR is set as the breakpoint level and the weighting processor 56 can be constructed in such a manner that if the actual estimated value SIR (=S) is greater than the set SIR, the weighting is made 1, and such that if estimated SIR is less than the set SIR, the smaller the estimated SIR, the smaller the weighting becomes.

(d) Method of Calculated Estimated SIR

An example of SIR estimation in a case where the modulation scheme is QPSK and the number of pilot signals in one slot is four will now be described.

Estimation of Desired Signal Power (S)

Figure 21:
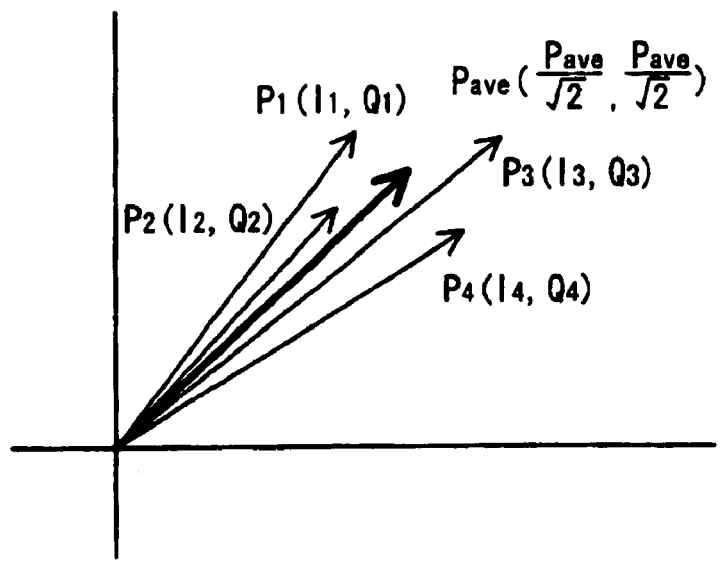
FIG. 21 is a diagram useful in describing SIR estimation.

Desired signal power (S) is calculated slot by slot in order to perform high-speed transmission power control. If we let the pilot of an Nth symbol in a certain slot be represented by $P_N(I_N, Q_N)$, the pilot signals in one slot will be $P_1(I_1, Q_1)$, $P_2(I_2, Q_2)$, $P_3(I_3, Q_3)$, $P_4(I_4, Q_4)$, as shown in FIG. 21, the voltages of these four symbols are added with regard to the in-phase components and quadrature components, and the averages of the summed voltages are obtained. Equation (8) below represents the average $I_{ave}$ of the in-phase components, and Equation (9) below represents the average $Q_{ave}$ of the quadrature components. Let the average reception point be $P_{ave}$ $(I_{ave}, Q_{ave})$.

$$I_{ave} = (I_1 + I_2 + I_3 + I_4)/4 \quad (8)$$

$$Q_{ave} = (Q_1 + Q_2 + Q_3 + Q_4)/4 \quad (9)$$

The estimated power (S) of the desired signal is the power of the average reception point, namely $$S = P_{ave}^2 = I_{ave}^2 + Q_{ave}^2 \quad (10)$$

Estimation of Interference Power (I)

Interference power is represented by distance (variance) from a reference-signal point. The reference-signal point is Pb $([P_{ave}^2/2]^{1/2}, [P_{ave}^2/2]^{1/2})$, and the in-phase and quadrature components become $1/\sqrt{2}$ of the average reception signal point $P_{ave}$. The deviation from the reference-signal point is the inference power of each symbol. If the average of one slot of the inference power is calculated and the average of a plurality of slots is obtained, this becomes the interference power Ip for calculating the estimated SIR. The following equation is an equation for calculating Ip.

$$Ip = \frac{1}{L}\sum_{j=1}^{N}\left[\frac{1}{N}\sum_{i=1}^{N}\left\{\left(\frac{Pave}{\sqrt{2}} - I_i\right)^2 + \left(\frac{Pave}{\sqrt{2}} - Q_i\right)^2\right\}\right] \quad (11)$$

L: average number of slots
N: average number of symbols

Thus if the estimated SIR is calculated, we have $$SIR = S/Ip \quad (12)$$

(e) Embodiment in Which Weighting is Performed After Synchronous Detection

Figure 22:
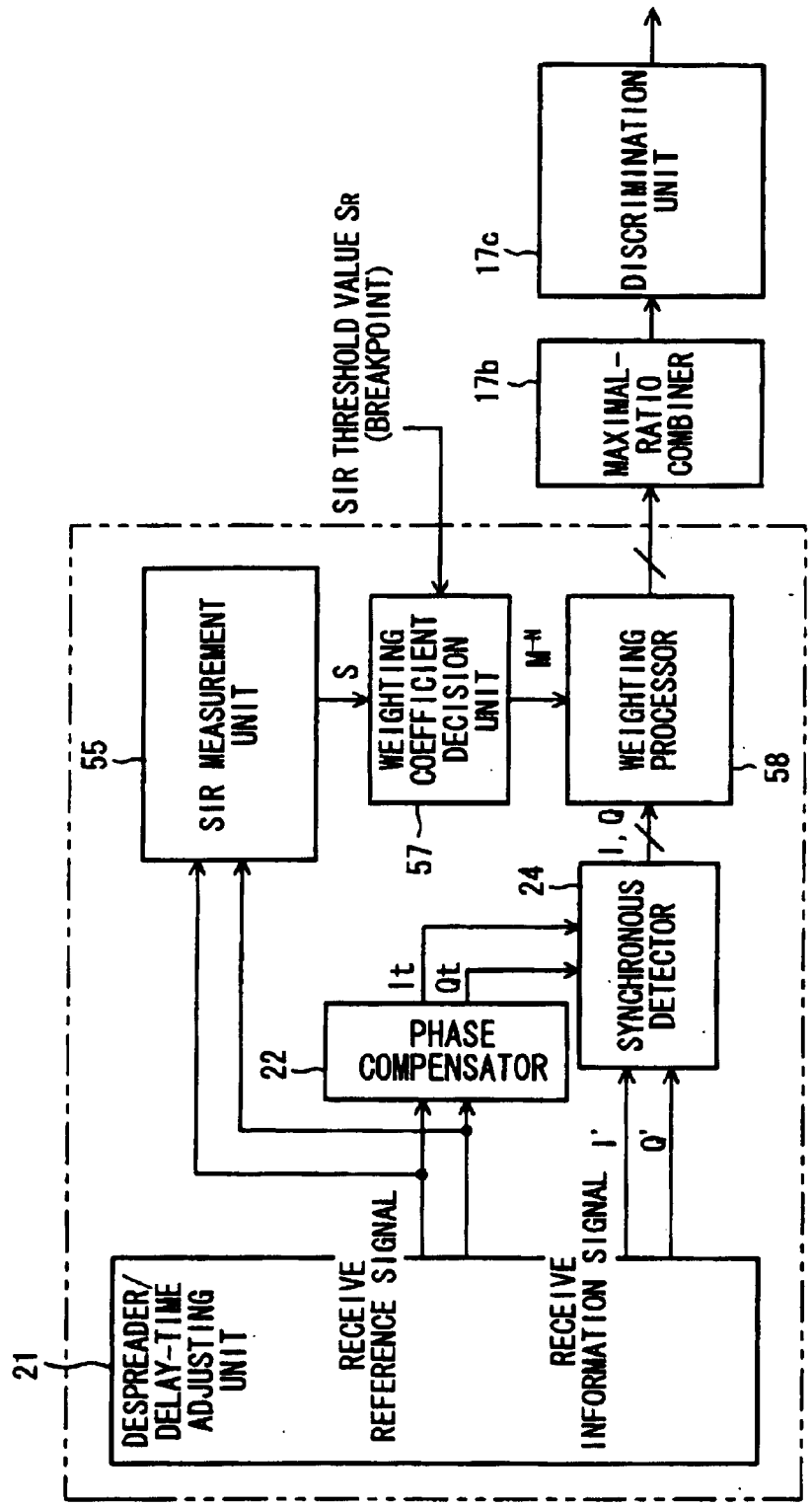
FIG. 22 is a diagram showing the structure of a finger in a case where weighting is performed after synchronous detection.

FIG. 22 is a diagram showing the structure of a finger in a case where weighting is performed after synchronous detection. Components identical with those of the embodiment of FIG. 19 are designated by like reference characters. This arrangement differs from that of FIG. 19 in that (1) the synchronous detector 24 performs synchronous detection in accordance with the following equation:

$$\begin{pmatrix} I \\ Q \end{pmatrix} = \begin{pmatrix} It & Qt \\ -Qt & It \end{pmatrix}\begin{pmatrix} I' \\ Q' \end{pmatrix} \quad (5)''$$

using the channel estimation signals (It, Qt); (2) a weighting coefficient decision unit 57 calculates the weighting coefficient $M^{-N}$ by a method the same as that of FIG. 19 and inputs the coefficient to a weighting processor 58; and (3) the weighting processor 58 multiplies the synchronous detection signal by the weighting coefficient $M^{-N}$ to applying weighting to the finger output.

Figure 23:
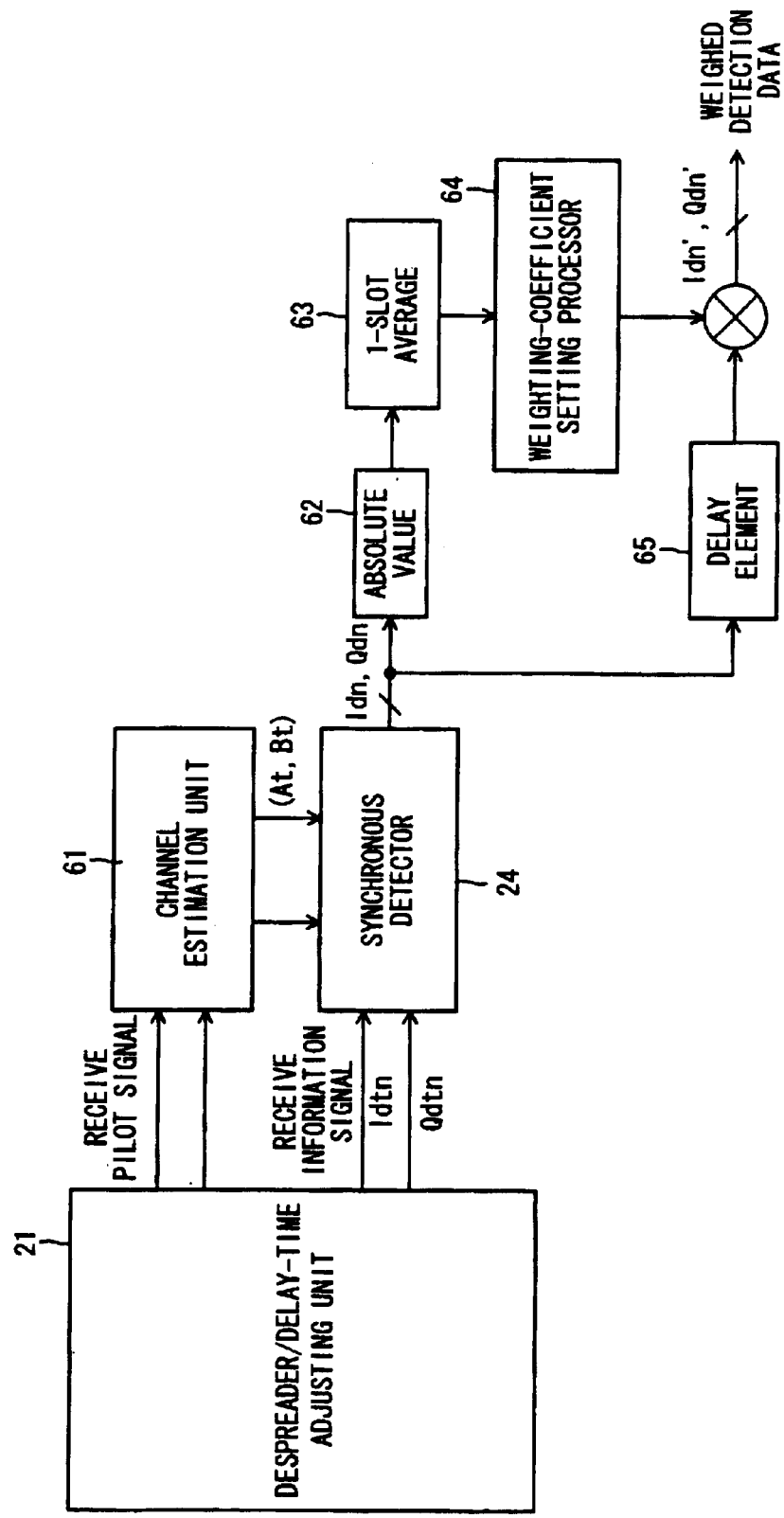
FIG. 23 shows an embodiment in which weighting processing is executed using a received information signal.
Figure 24:
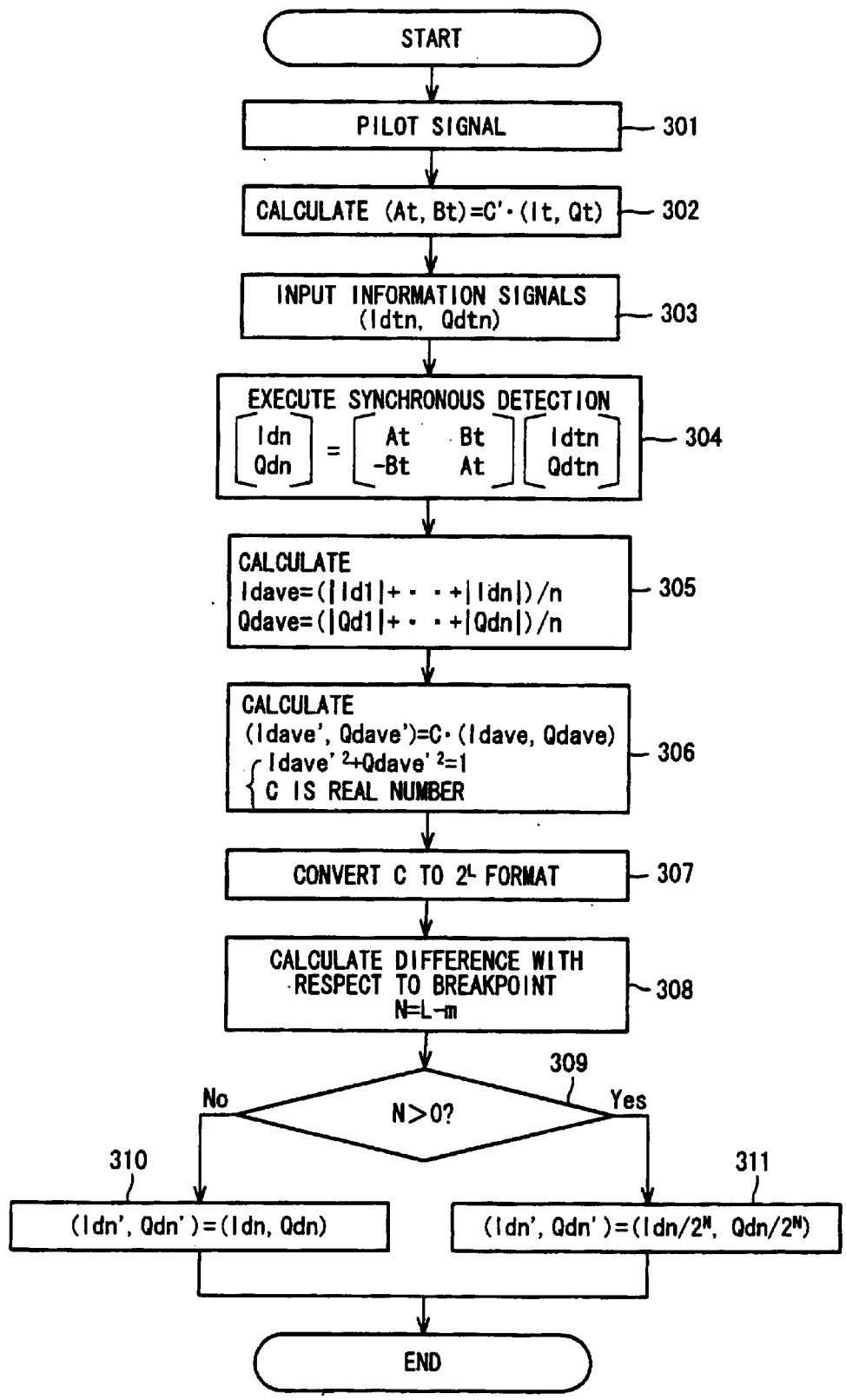
FIG. 24 is a flowchart of processing in a case where weighting processing is executed using a received information signal.

(E) Embodiment in Case Where Weighting is Performed Based Upon Reception Power of Information Signal FIG. 23 is a diagram showing the structure of a finger in a case where weighting is applied based upon the reception power of the information signal, and FIG. 24 is a flowchart of processing in a case where weighting is applied based upon the reception power of the information signal.

The despreader/delay-time adjusting unit 21 subjects a direct wave or delayed wave that arrives via a prescribed path to despread processing using a code identical with the spreading code, then applies delay processing conforming to the path and outputs two types of signals, namely a pilot signal and information signal (Idtn, Qdtn) (step 301). A channel estimation unit 61 generates channel estimation signals (It, Qt) by averaging the entered pilot signals over one slot, applies normalization processing to the channel estimation signals (It, Qt) and inputs the normalized channel estimation signals (At, Bt) to the synchronous detector 24. That is, the channel estimation unit 61 finds the multiple C' that satisfies the following equation:

$$C \cdot (It^2 + Qt^2)^{1/2} = 1$$

obtains normalized channel estimation signals (At, Bt) ($At^2 + Bt^2 = 1$) in accordance with the following equation:

$$(At, Bt) = C \cdot (It, Qt)$$

and inputs these to the synchronous detector 24 (step 302).

The synchronous detector 24 performs synchronous detection in accordance with the following equation if the receive information signals (Idtn, Qdtn) are input thereto from the despreader/delay-time adjusting unit 21 (step 303):

$$\begin{pmatrix} Idn \\ Qdn \end{pmatrix} = \begin{pmatrix} At & Bt \\ -Bt & At \end{pmatrix}\begin{pmatrix} Idtn \\ Qdtn \end{pmatrix}$$

An absolute-value calculation unit 62 calculates, symbol by symbol, the absolute values of the synchronously detected information signals, and an average calculation unit 63 obtains absolute-value averages Idave, Qdave over the number of symbols in one slot in accordance with the following equations (step 305):

$$Idave = (|Id_1| + Id_2| + \ldots + |Id_n|)/n$$

$$Qdave = (|Qd_1| + |Qd_2| + \ldots + |Qd_n|)/n$$

A weighting-coefficient setting processor 64 finds the multiple C that satisfies the following equation:

$$C \cdot (Idave^2 + Qdave^2)^{1/2} = 1$$

and executes normalization processing in accordance with the following equation (step 306):

$$(Idave', Qdave') = C \cdot (Iave, Qave)$$

Further, the weighting-coefficient setting processor 64 converts C to the 2L format (step 307) and compares L with the breakpoint m. This comparison processing is executed by performing the operation N=L−m (step 308) and discriminating the sign thereof (step 309). If N≦0 (L≦m) holds, the weighting coefficient is 1. If N>0 (L>m) holds, on the other hand, then the weighting coefficient is $2^{-N}$.

A delay element 65 delays the synchronous detection output (Idn, Qdn) for the amount of time it takes for the weighting coefficient to be found. A multiplier outputs (Idn', Qdn'), which is given by the following equation:

(Idn', Qdn')=(Idn, Qdn)

to a RAKE combiner (step 310) if $N \leq 0$ ($L \leq m$) holds, and outputs (Idn', Qdn'), which is given by the following equation:

(Idn', Qdn')=(Idn/$2^N$, Qdn/$2^N$)

to the RAKE combiner (step 311) if $N>0$ ($L>m$) holds.

(F) Embodiment in Which Weighting Coefficient is Decided in Searcher

Figure 25:
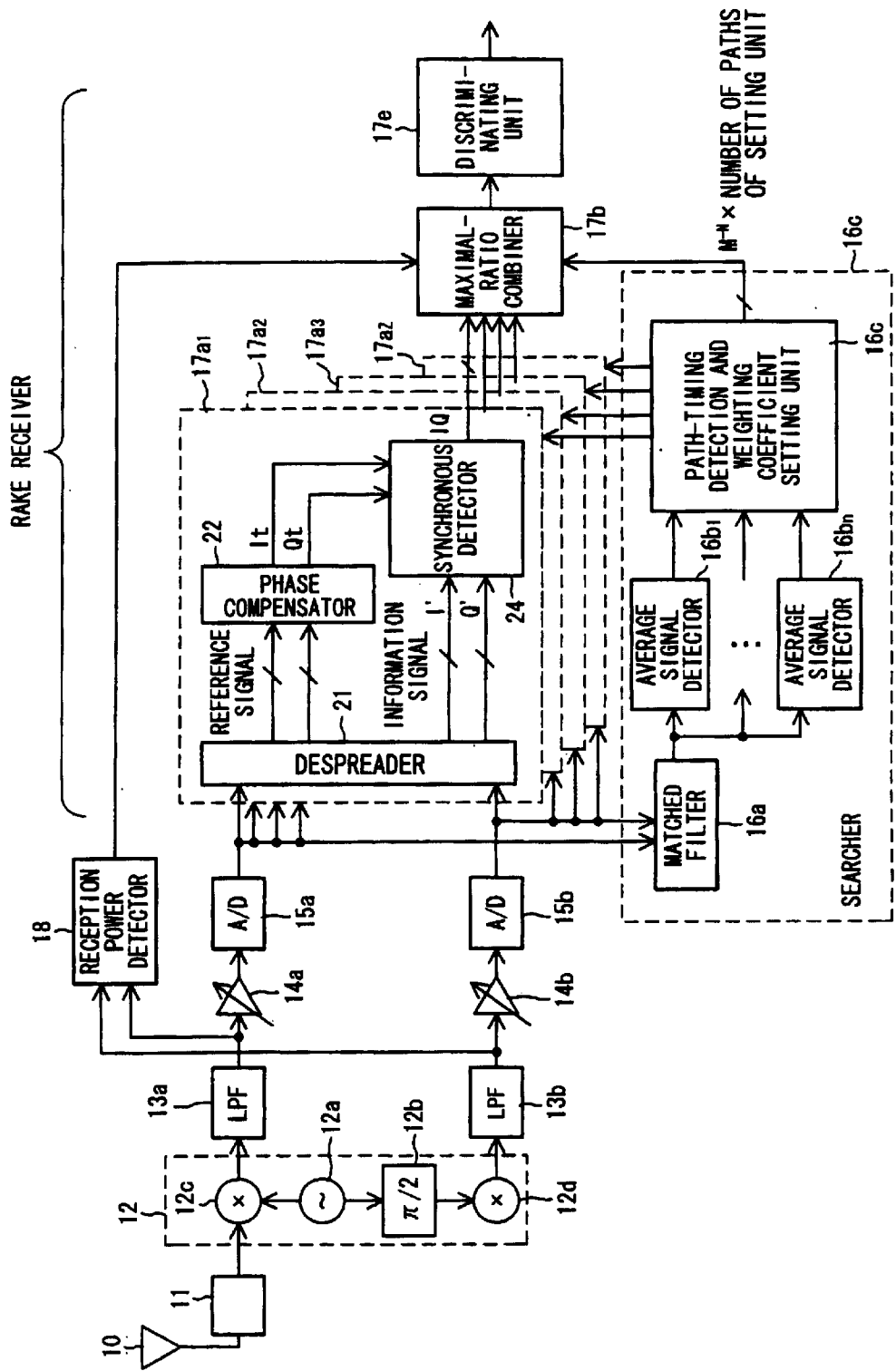
FIG. 25 is a diagram showing the structure of a CDMA receiver of an embodiment in which a weighting coefficient is decided by a searcher.

FIG. 25 is a diagram showing the structure of a CDMA receiver of an embodiment in which a weighting coefficient is decided by a searcher. Components identical with those shown in FIG. 1 are designated by like reference characters. This arrangement differs from that of FIG. 1 in that (1) the weighting processor is deleted from the finger, with the weighting coefficient being decided by the searcher 16; (2) the synchronous detector 24 performs synchronous detection in accordance with the following equation:

$$\begin{pmatrix} I \\ Q \end{pmatrix} = \begin{pmatrix} It & Qt \\ -Qt & It \end{pmatrix} \begin{pmatrix} I' \\ Q' \end{pmatrix}$$

and (3) the maximal ratio combiner 17b multiplies the finger outputs by the weighting coefficients and combines the results.

A matched filter 16a in the searcher 16 calculates correlation values at respective ones of the timings and inputs these to average power detectors $16b_1$ to $16b_n$ corresponding to respective ones of the timings. The average power detectors $16b_1$ to $16b_n$ perform amplitude addition with regard to the correlation values on a per-slot basis, thereby improving the S/N ratio, convert the amplitude averages of the slot to power and calculate the average power over a plurality of slots. On the basis of this information, a path-timing detection and weighting coefficient setting unit 16c determines the timing of each path of multipath, compares the breakpoint and the average power value of the delayed path determined, and decides the weighting coefficient $M^{-N}$ for each path determined. The searcher 16 reports the weighting coefficient to the maximal ratio combiner 17b, and the latter discriminates "1", "0" of the data based upon the combined signal. It should be noted that the weighting coefficient is decided in accordance with the method shown in FIGS. 16 to 18.

(G) Control for Changing Over Breakpoint

In transmission of information, transmission power control for controlling the transmission power of a mobile station is carried out by the base station in such a manner that the minimum necessary error rate is obtained. Transmission power control of a high-speed closed loop for performing control in such a manner that estimated SIR will agree with the reference SIR is known generally. Further, since the requisite Eb/Io for obtaining the above-mentioned error rate varies depending upon an increase or decrease in subscribers and in dependence upon the propagation-path environment, etc., it is necessary to vary the reference SIR value in conformity therewith. For example, a graph requisite Eb/Io based upon the propagation path is as shown in FIG. 5. Since the requisite Eb/Io varies owing to fading, it is known that updating of the reference SIR value is required because of fading. In a case where updating of the SIR value is carried out, updating of the breakpoint also is performed at the same time.

Methods of updating the breakpoint include (1), a method of updating the set SIR in accordance with a change in reference SIR in a case where the breakpoint level is set by the SIR, and (2) a method of updating the breakpoint level based upon the maximum reception power or minimum reception power of the reception powers in each delayed path in a case where the breakpoint level is set by the reception power.

(a) Embodiment for Case Where Breakpoint Level is Set by SIR

Figure 26:
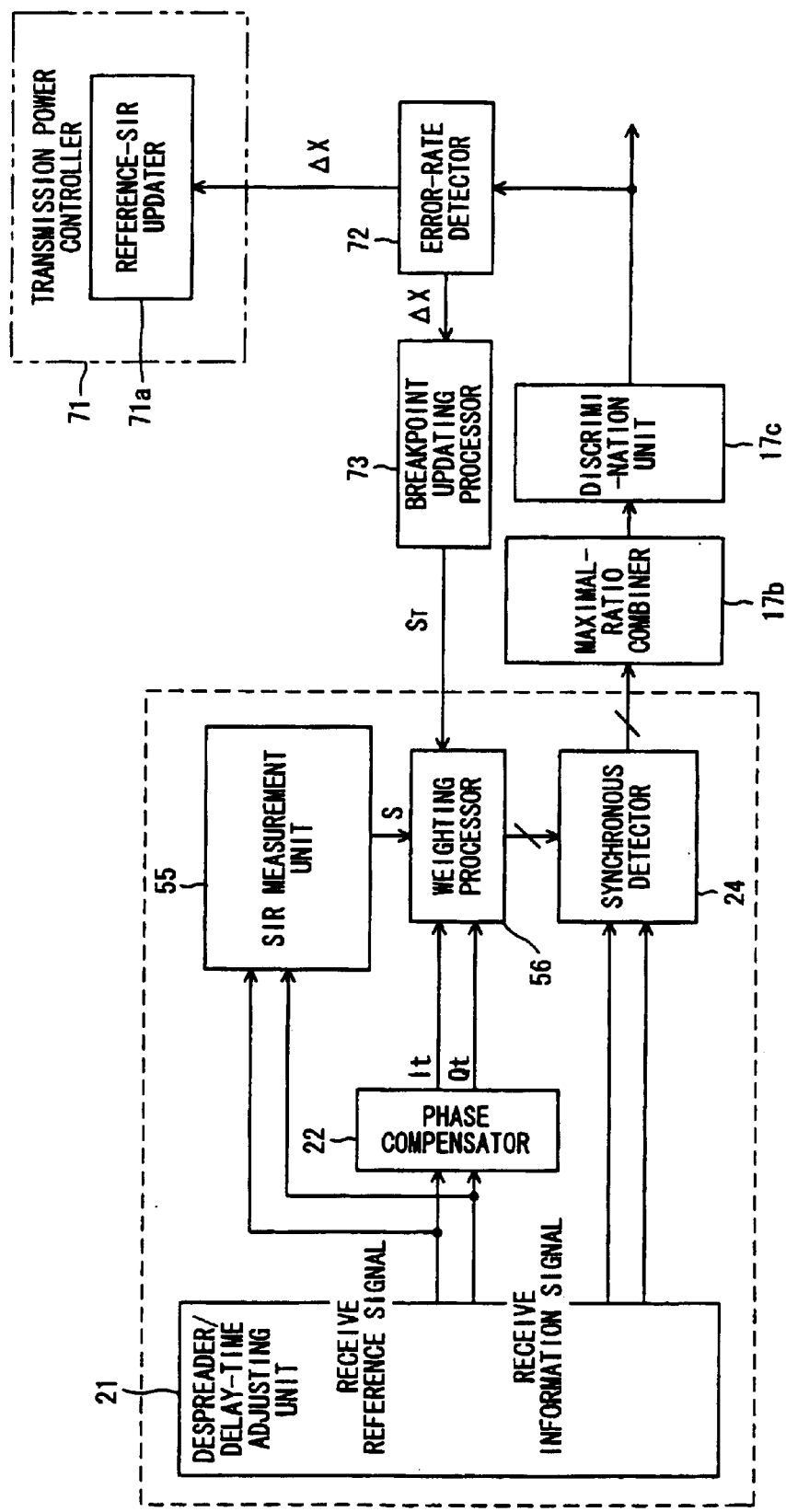
FIG. 26 shows an embodiment for controlling a breakpoint (in a case where the breakpoint is set based upon a SIR)

FIG. 26 shows an embodiment for controlling a breakpoint in accordance with a change in reference SIR in a case where the breakpoint is set based upon a SIR. Components identical with those of the structure shown in FIG. 19 are designated by like reference characters. A predetermined SIR value (=$S_T$) is set as the breakpoint level in the weighting processor 56. If the actual estimated SIR (=S) is greater than the set SIR (=$S_T$), the path is a valid path and the weighting processor adopts 1 as the weighting coefficient; if the estimated SIR is less than the set SIR (=$S_T$), then the smaller the estimated SIR becomes, the smaller the weighting processor makes the weighting coefficient.

At the beginning, the reference SIR value needed to obtain the desired error rate and the breakpoint level (the set SIR) $S_T$ are set in a transmission power controller 71 and weighting processor 56, respectively. If transmission between the mobile station and base station starts under these conditions, an error-rate detector 72 detects an error rate e included in results of discrimination from the discrimination unit 17c and compares the error rate e with a requisite error rate $e_s$. If $e>e_n$ holds, the error-rate detector 72 outputs a control signal for updating the reference SIR and the set SIR each by $\Delta X$ dB. As a result, a reference-SIR updater 71a in the transmission power controller 71 updates the reference SIR in accordance with the following equation:

reference $SIR+\Delta X \rightarrow$ reference $SIR$

Further, a breakpoint updating processor 73 also updates the set SIR (=$S_T$) in accordance with the following equation:

$S_T+\Delta X \rightarrow S_T$

Changing $\Delta X$ dB may be performed in increments of $\Delta n$ dB over a period of time, or $\Delta X$ dB may be updated a single time.

By virtue of the above operation, a change in propagation-point environment, etc. can be dealt with as a relative breakpoint and not as an absolute breakpoint.

The weighting processor 56 estimates the actual SIR (=S) and adopts 1 as the weighting coefficient if the estimated SIR is greater than the set SIR (=$S_T$). If the estimated SIR is less than the set SIR, then the weighting processor 56 decides the weighting coefficient C (=$M^{-N}$) in such a manner that the smaller the estimated SIR becomes, the smaller the weighting coefficient becomes, and calculates a weighted channel estimation signal in accordance with the following equation:

(At', Bt')=C(It, Qt)

The synchronous detector 24 performs synchronous detection using the weighted channel estimation signal.

Figure 27:
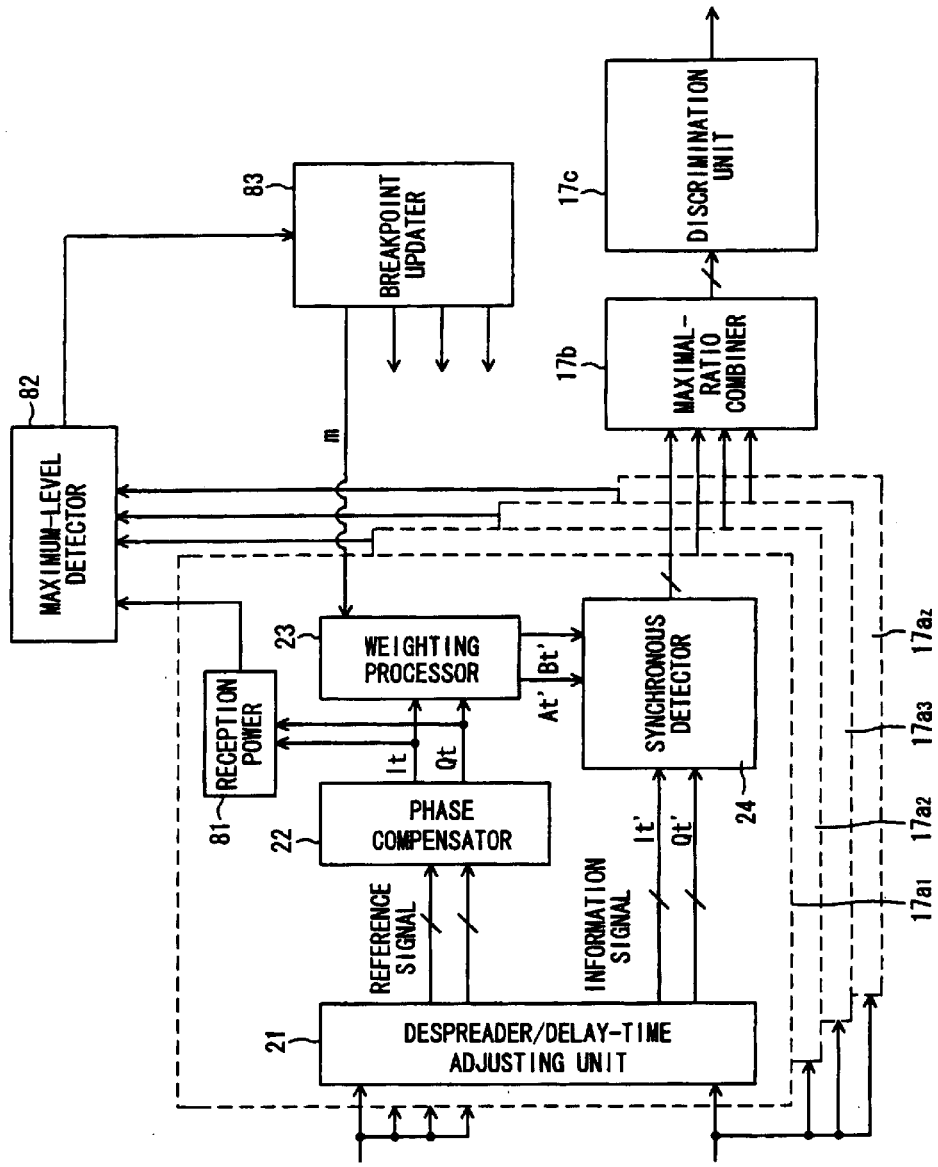
FIG. 27 shows an embodiment for controlling a breakpoint (in a case where the breakpoint is set based upon reception power)
Figure 28:
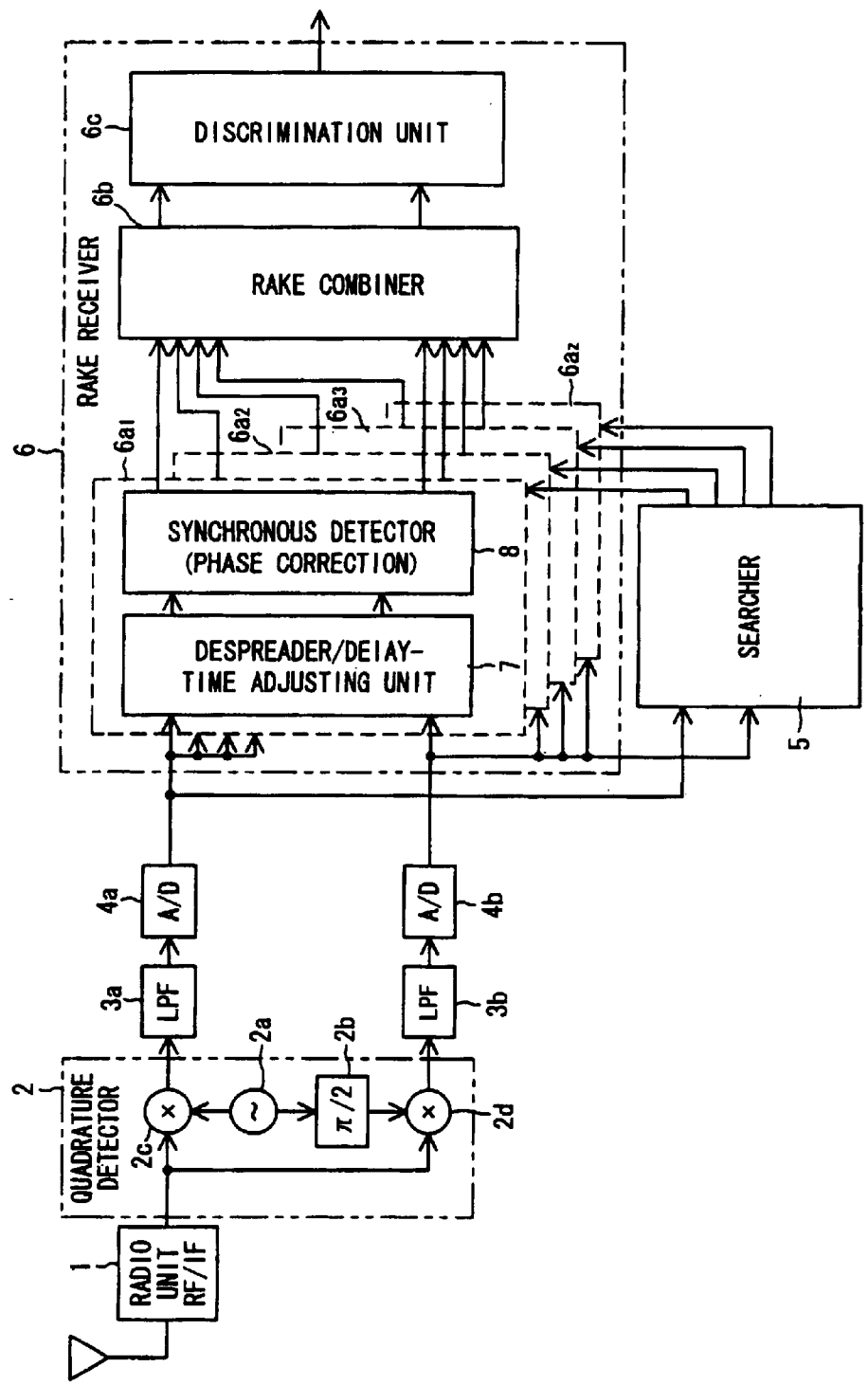
FIG. 28 is a diagram showing the structure of a CDMA receiver according to the prior art.
Figure 29:
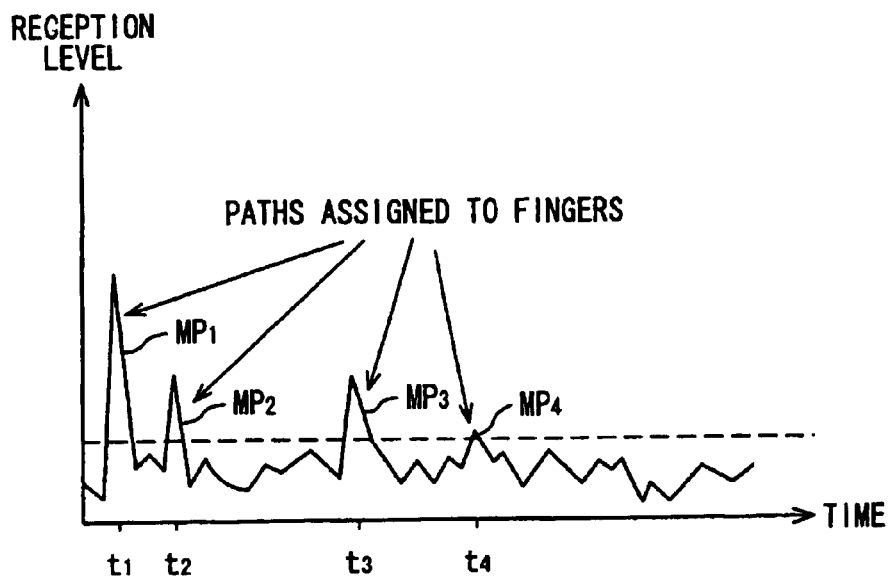
FIG. 29 is a diagram useful in describing a delay profile.
Figure 30:
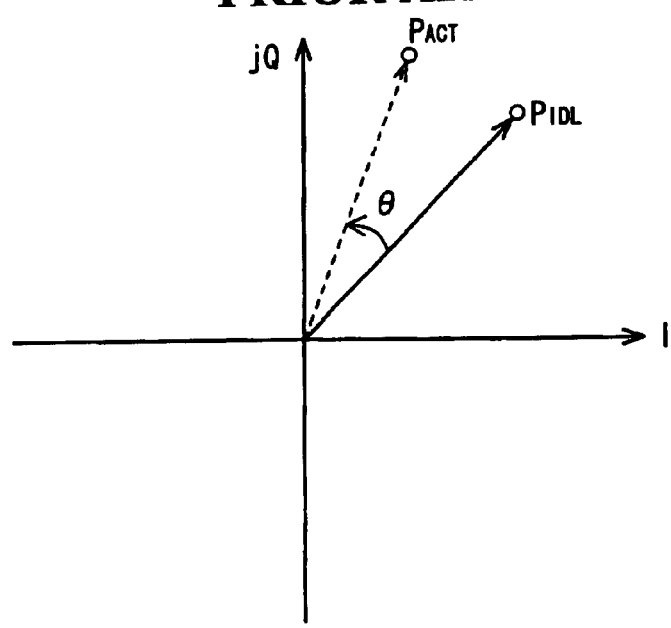
FIG. 30 is a diagram useful in describing phase rotation of a pilot signal.
Figure 31:
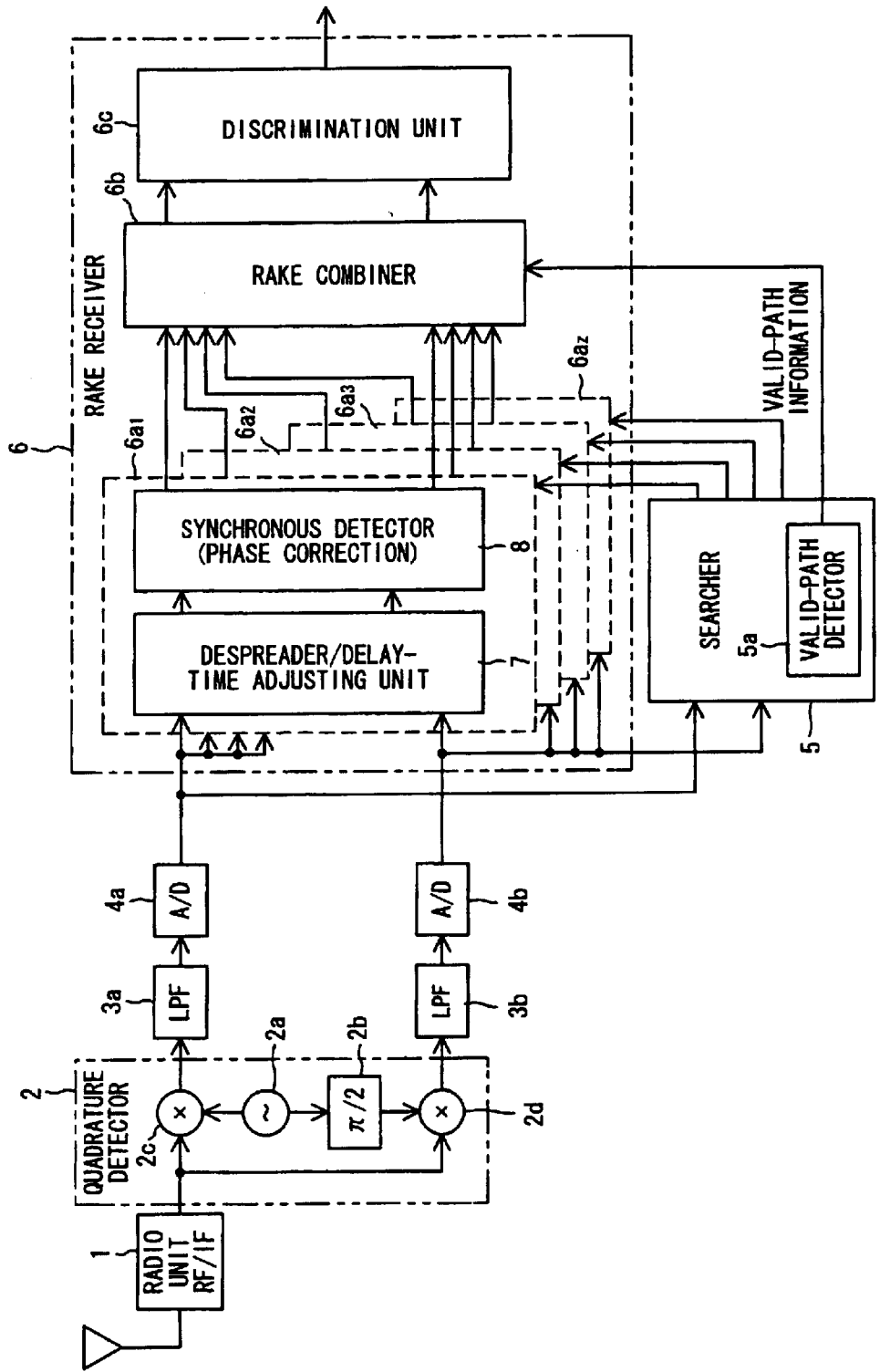
FIG. 31 is a diagram showing another structure of a CDMA receiver according to the prior art.
Figure 32:
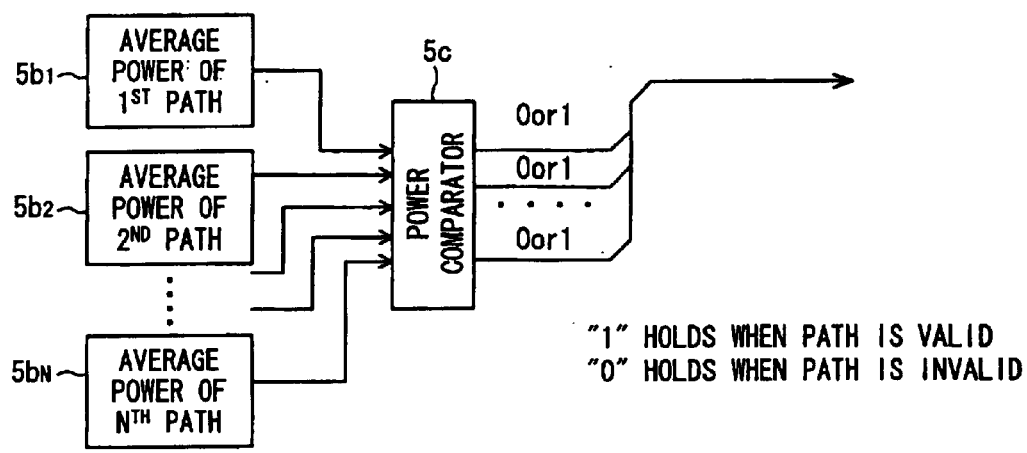
FIG. 32 is a diagram showing the structure of a valid-path detector.

(b) Embodiment for a Case Where Breakpoint Level is Set Based Upon Reception Power FIG. 27 shows an embodiment of a RAKE receiver for controlling breakpoint level based upon maximum power among the reception power values of the respective delayed paths in a case where the breakpoint level is set based upon reception power. Components identical with those of the structure shown in FIG. 1 are designated by like reference characters.

At the beginning, the initial breakpoint level is set in the weighting processor 23. If transmission between the mobile station and base station starts under these conditions, a reception power detector 81 provided in each of fingers $17a_1$ to $17a_z$ of the respective paths detects based upon $It^2+Qt^2$ the power of direct waves or delayed waves that arrive via the local path and inputs the detected power to a maximum-level detector 82. The latter detects the maximum reception power Pmax among the reception power values of all paths and inputs the same to a breakpoint updater 83. The latter executes updating of the breakpoint m in accordance with the following equation:

$$m = P\max - \Delta Y$$

so that the difference between the maximum reception power Pmax and the breakpoint level will be $\Delta Y$ dB at all times, and sets the new breakpoint level m in the weighting processor 23 of each finger. By virtue of the above operation, a change in propagation-point environment, etc. can be dealt with as a relative breakpoint and not as an absolute breakpoint.

The weighting processor 23 detects reception power and adopts 1 as the weighting coefficient if the reception power is above breakpoint level. If the reception power is below the breakpoint level, the weighting processor 23 decides the weighting coefficient C $(=M^{-N})$ in such a manner that the smaller the reception power becomes, the smaller the weighting coefficient becomes, and calculates a weighted channel estimation signal in accordance with the following equation:

$$(At', Bt') = C(It, Qt)$$

The synchronous detector 24 performs synchronous detection using the weighted channel estimation signal.

In the foregoing, the breakpoint level is controlled by detecting the maximum power. However, it is also possible to control the breakpoint level by detecting minimum reception power Pmin. That is, an arrangement can be adopted in which updating of the breakpoint m is performed in accordance with the following equation:

$$m = P\min + \Delta Z$$

so that the difference between the minimum reception power Pmin and the breakpoint level will be $\Delta Z$ dB at all times and the new breakpoint level m is set in the weighting processor 23 of each finger.

Thus, in accordance with the present invention, the performance of a CDMA receiver can be improved.

What is claimed is:

1. A CDMA receiver for applying despread processing to direct wave or delayed waves that arrive via each path of multiple paths, applying synchronous detection processing to the despread signals obtained, combining the detection signals of respective paths and discriminating the received data on the basis of the combined signal, comprising:

a weighting unit provided for each path, wherein if a prescribed signal component of a direct wave or delayed wave that arrives via an assigned path is below a set level (breakpoint level), said weighting unit applies weighting, by multiplying the output signal by a weighting coefficient the value of which is smaller than 1 and conforms to the level of said signal component;

a combiner for combining signals output from the weighting units of each of the paths; and a data discriminating unit for discriminating received data based upon the output signal of the combiner.

2. A CDMA receiver according to claim 1, wherein the weighting unit adopts 1 as a weighting coefficient if said signal component is greater than a set level.

3. A CDMA receiver according to claim 1, wherein $M^{-N}$ is adopted as a weighting coefficient and the smaller said signal component becomes in comparison with the set level, the larger N is made.

4. A CDMA receiver according to claim 1, wherein when reception power is adopted as said signal component, said weighting unit averages pilot signals, which are contained in the received signal, over one or more slots, calculates reception power using the average value, decides a weighting coefficient based upon a difference or ratio between said reception power and a set power, which is said set level, and weights the output signal.

5. A CDMA receiver according to claim 4, wherein said weighting unit multiplies an information signal by the weighting coefficient at the time of synchronous detection, thereby weighting the output.

6. A CDMA receiver according to claim 4, wherein said weighting unit multiplies the detection signal, which prevails after synchronous detection, by a weighting coefficient, thereby weighting the output signal.

7. A CDMA receiver according to claim 1, wherein when reception power is adopted as said signal component, said weighting unit averages information signals, which are contained in the received signal, over one or more slots, calculates reception power using the average value, decides a weighting coefficient based upon a difference or ratio between said reception power and a set power, which is said set level, and weights the output signal.

8. A CDMA receiver according to claim 1, further comprising:

a maximum-level detector for detecting a maximum level Pmax of reception powers of respective ones of the paths when reception power is adopted as said signal component; and a set-level updating unit for adopting a value, which is obtained by subtracting a set level $\Delta Y$ from the maximum level Pmax, as said set level.

9. A CDMA receiver according to claim 1, further comprising:

a minimum-level detector for detecting a minimum level Pmin of reception powers of respective ones of the paths when reception power is adopted as said signal component; and a set-level updating unit for adopting a value, which is obtained by adding a set level $\Delta Z$ to the minimum level Pmin, as said set level.

10. A CDMA receiver according to claim 1, wherein when a SIR, which is a ratio between signal power and interference power, is adopted as said signal component, said weighting unit estimates the SIR of the assigned path, decides a weighting coefficient based upon a difference or ratio between said estimated SIR and a set SIR, which is the set level, and weights the output signal.

11. A CDMA receiver according to claim 10, further comprising:

an error-rate detector for detecting error rate of discriminated data;

a transmission power controller for controlling transmission power of a transmitter in such a manner that the estimated SIR becomes a reference SIR; and a set-SIR updating unit for updating said set SIR when said reference SIR is updated in such a manner that the error rate becomes a set value.

12. A CDMA receiver according to claim 1, wherein when an average of absolute values of orthogonal signal components (I-signal component, Q-signal component) of a pilot signal contained in the received signal is adopted as said signal component, said weighting unit averages pilot signals over one or more slots, calculates an average of absolute values of said orthogonal signal components using said average value, decides a weighting coefficient based upon a difference or ratio between the average of said absolute signals and a set average, which is the set level, and weights the output signal.

13. A CDMA receiver according to claim 1, wherein when the larger of absolute values of orthogonal signal components (I-signal component, Q-signal component) of a pilot signal contained in the received signal is adopted as said signal component, said weighting unit averages pilot signals over one or more slots, decides a weighting coefficient based upon a difference or ratio between the larger absolute value of the orthogonal signals (I-signal component, Q-signal component) and a set absolute value, which is the set level, and weights the output signal.

14. A CDMA receiver according to claim 1, wherein the lower the transmission rate of a symbol becomes and the greater a spreading gain, the lower said set level is made.

15. A CDMA receiver according to claim 1, further comprising a reception power calculation unit for multiplying the combined signal by the reciprocal of maximum weighting among the weightings of respective paths, thereby calculating reception power.

16. A CDMA receiver according to claim 1, further comprising a searcher for detecting multipath, wherein said searcher decides a weighting coefficient applied to an output signal of each path, and said weighting unit multiplies the output signal of each path by said weighting coefficient.

* * * * *